Sept. 19, 1950 F. C. FROLANDER ET AL 2,523,109
TYPOGRAPHICAL DISTRIBUTING MACHINE
Filed March 8, 1945 18 Sheets-Sheet 7
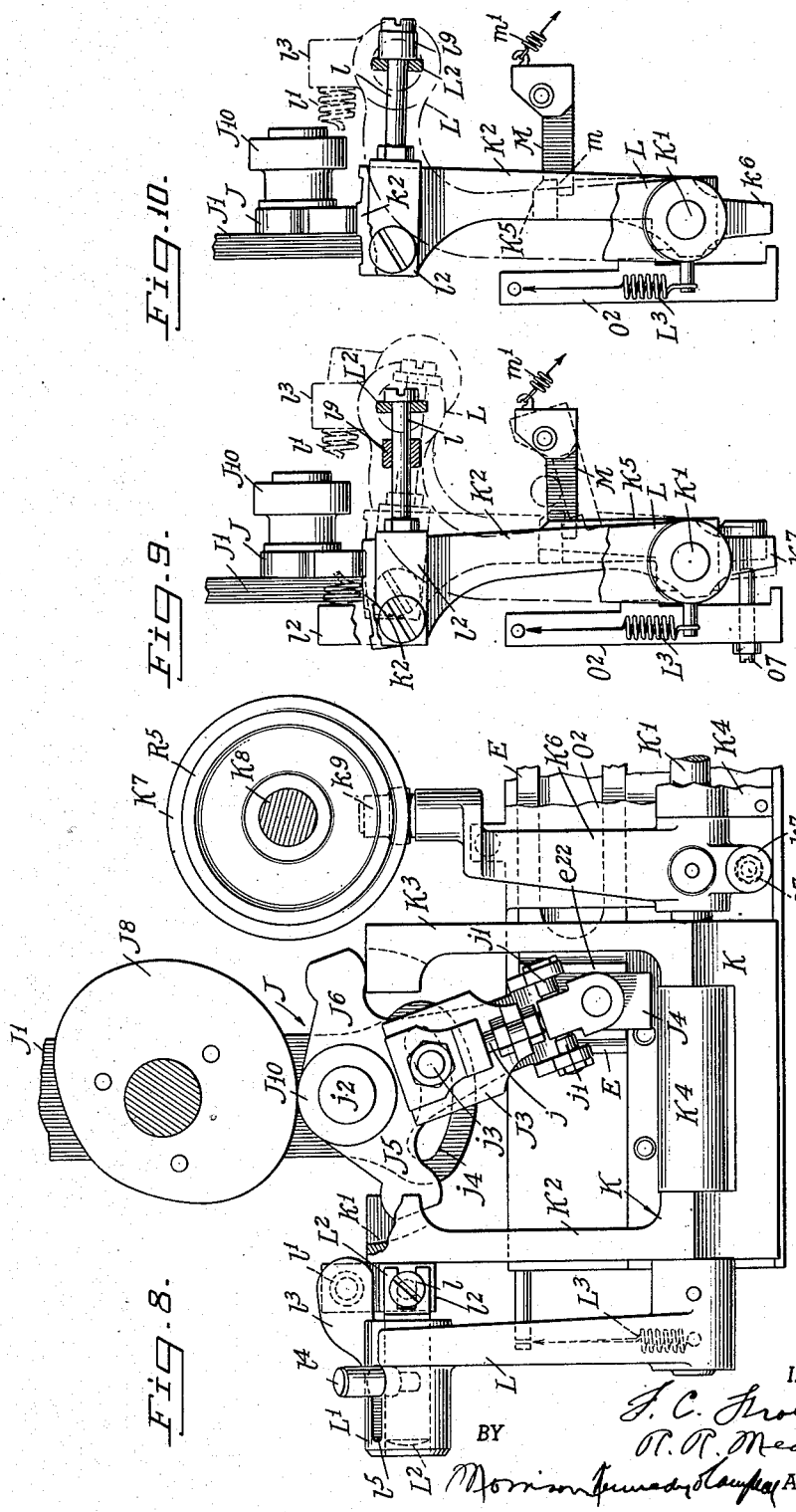
INVENTORS
F. C. Frolander
T. T. Mead
BY Morrison Kennedy Campbell ATTORNEYS Sept. 19, 1950  F. C. FROLANDER ET AL  2,523,109
TYPOGRAPHICAL DISTRIBUTING MACHINE
Filed March 8, 1945  18 Sheets-Sheet 8
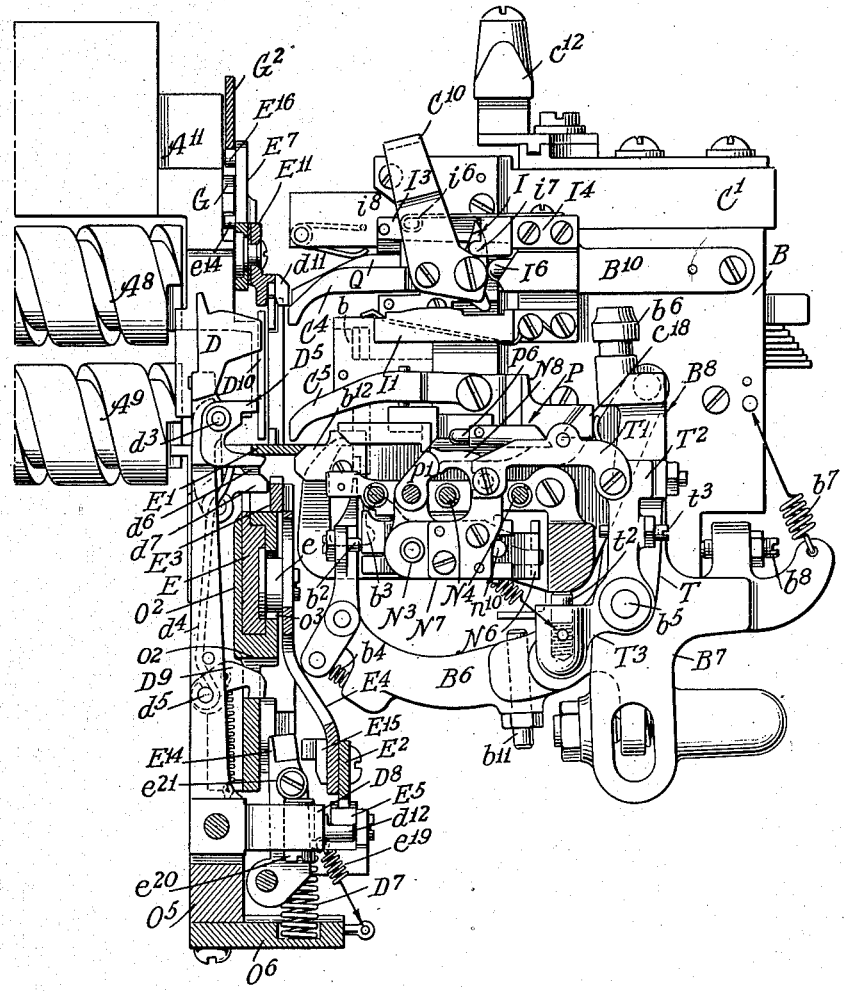

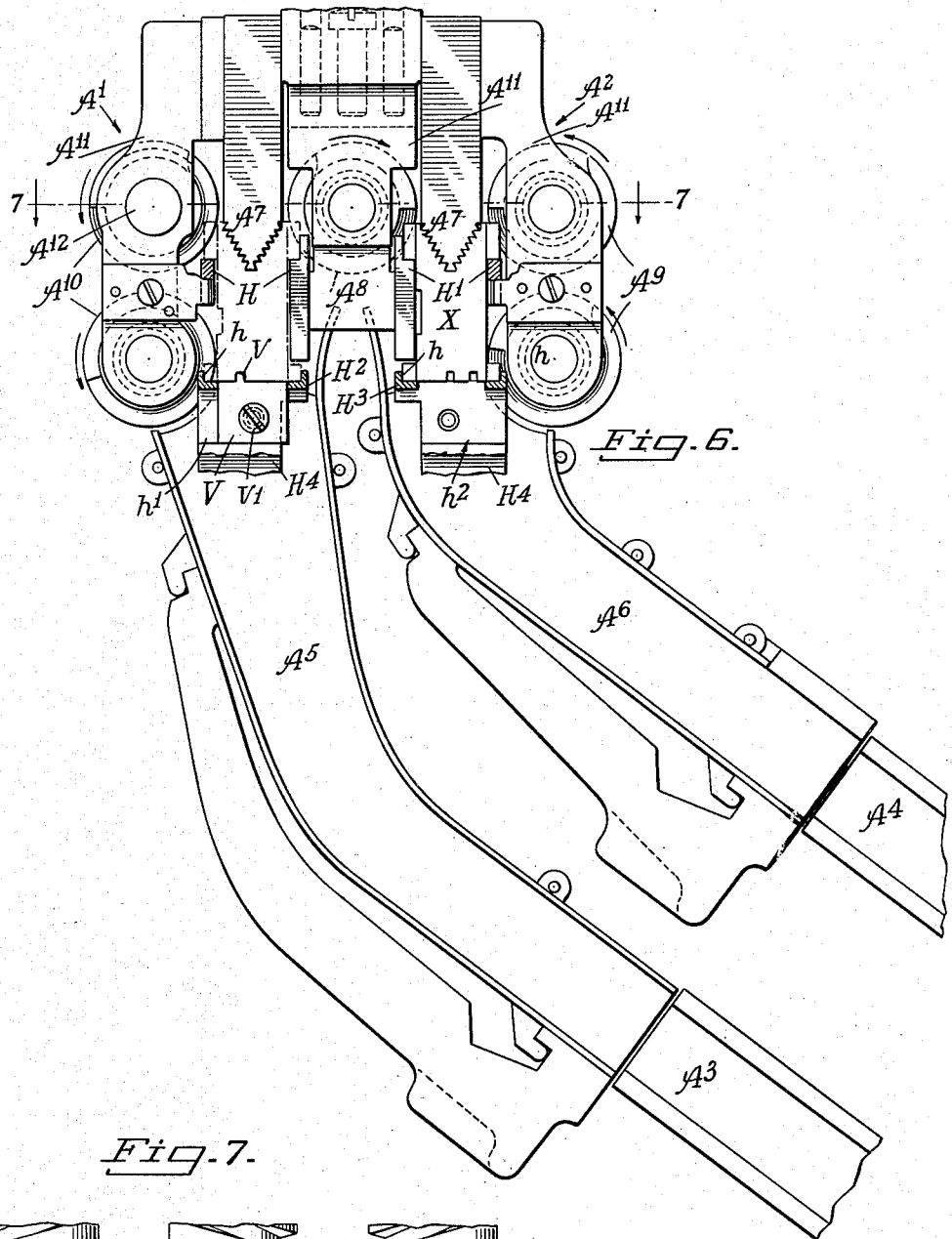
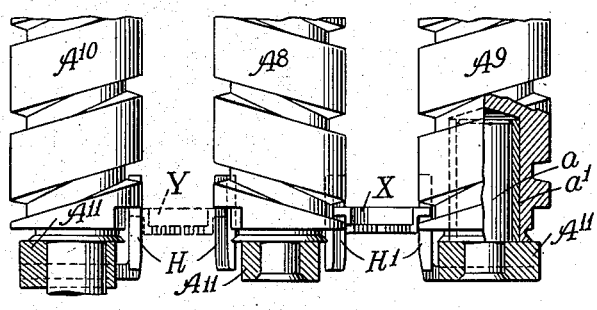

Sept. 19, 1950   F. C. FROLANDER ET AL   2,523,109
TYPOGRAPHICAL DISTRIBUTING MACHINE
Filed March 8, 1945   18 Sheets-Sheet 9
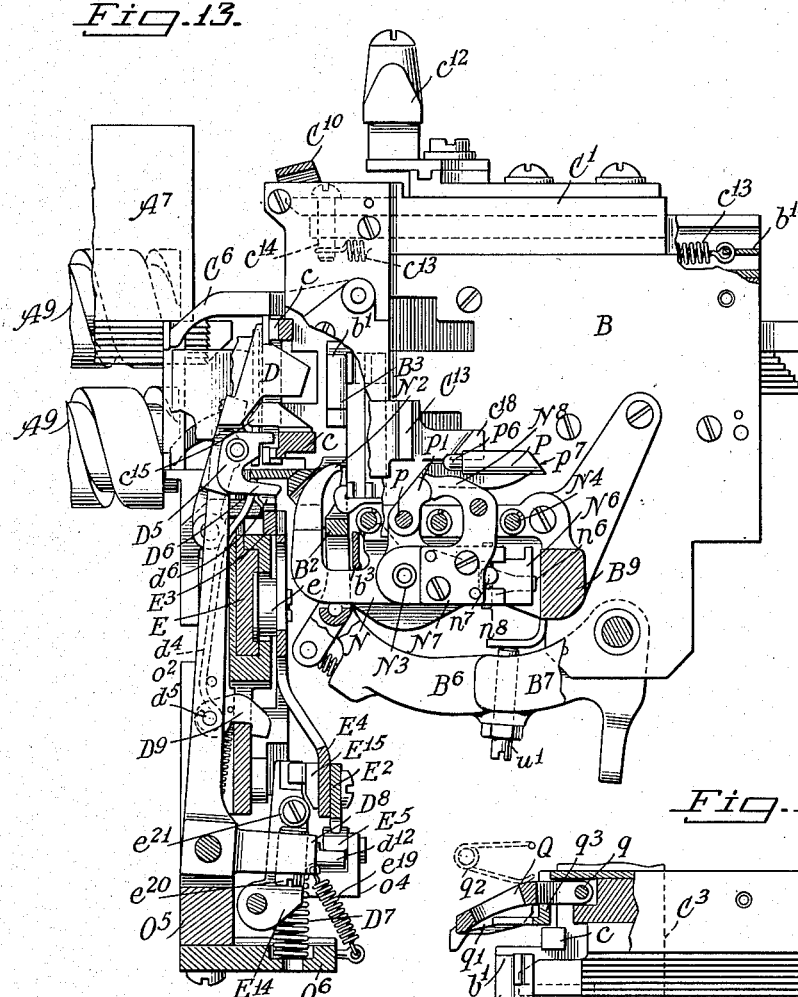
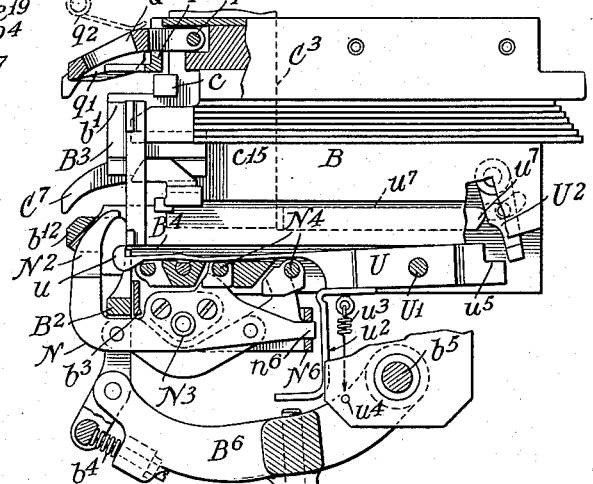

Sept. 19, 1950  F. C. FROLANDER ET AL  2,523,109
TYPOGRAPHICAL DISTRIBUTING MACHINE
Filed March 8, 1945  18 Sheets-Sheet 10
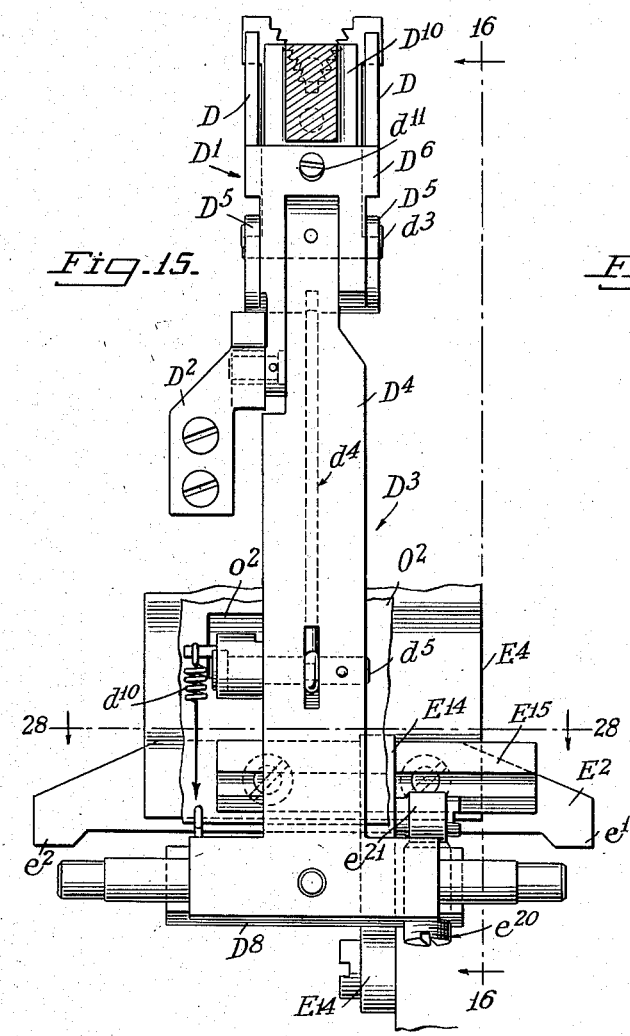
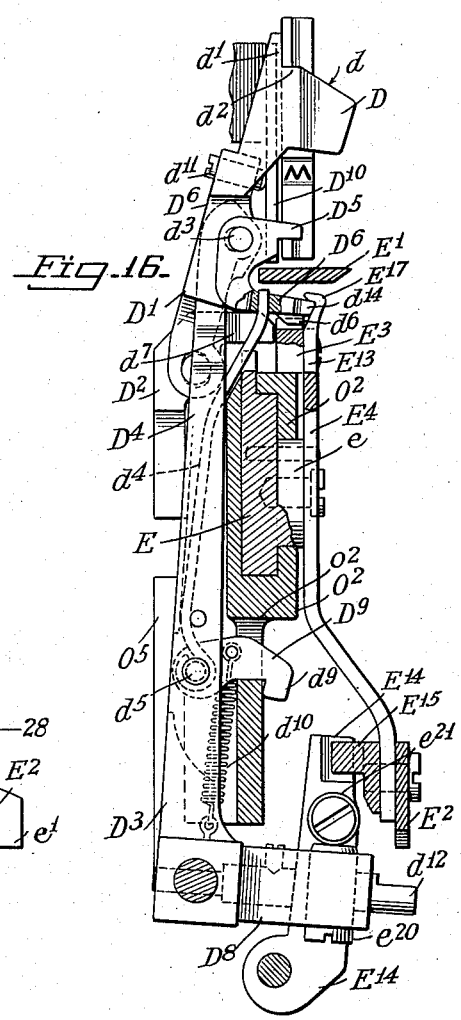
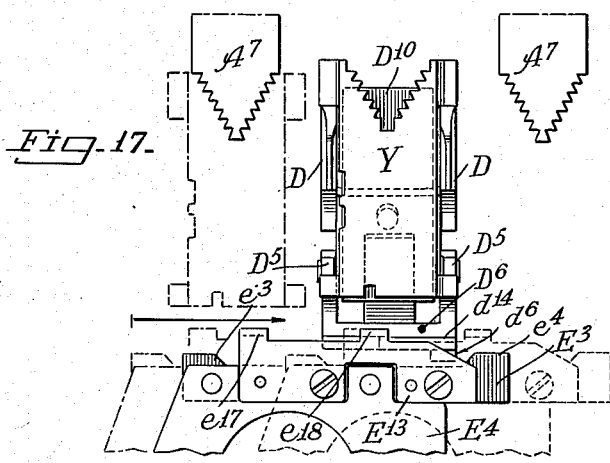
INVENTORS
F. C. Frolander
A. T. Mead
By Morrison, Kennedy
& Campbell ATTORNEYS Sept. 19, 1950  F. C. FROLANDER ET AL  2,523,109
TYPOGRAPHICAL DISTRIBUTING MACHINE
Filed March 8, 1945  18 Sheets-Sheet 11
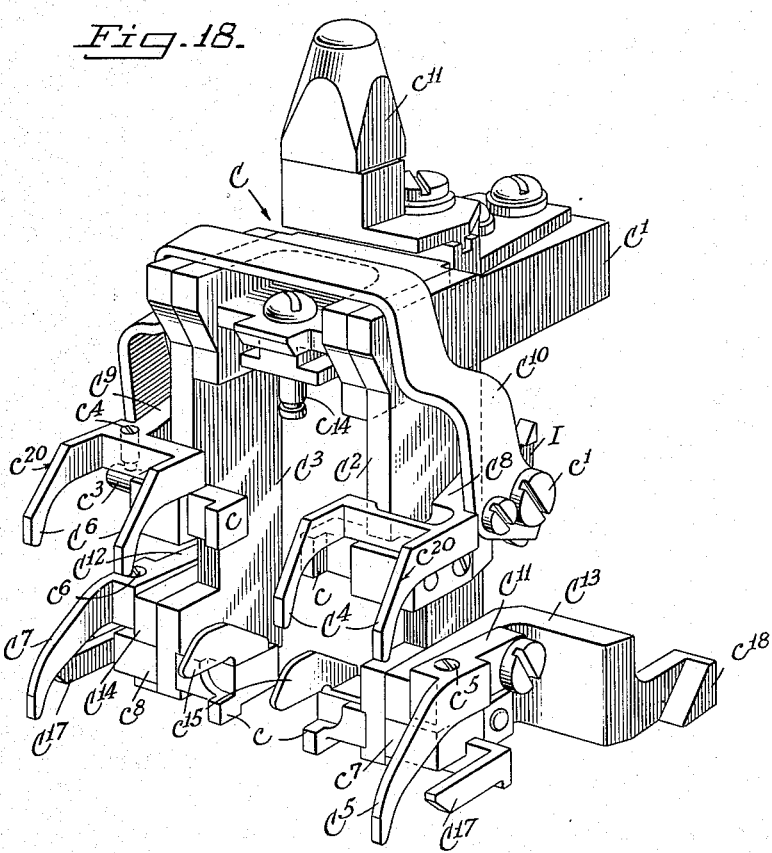

Sept. 19, 1950 F. C. FROLANDER ET AL 2,523,109
TYPOGRAPHICAL DISTRIBUTING MACHINE
Filed March 8, 1945 18 Sheets-Sheet 12
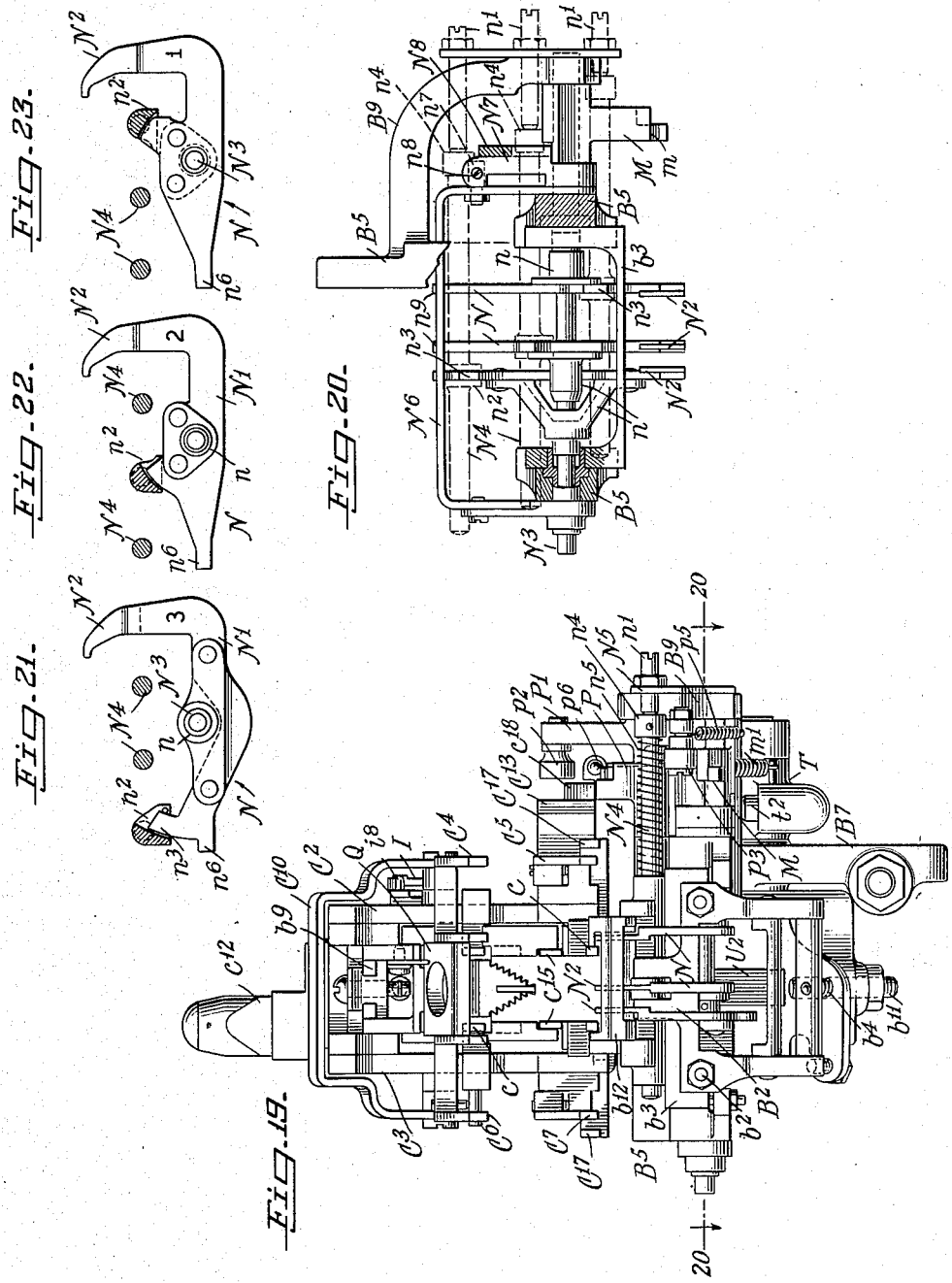
INVENTORS
F. C. Frolander
P. R. Mead
BY
Morrison, Kennedy, Campbell ATTORNEYS

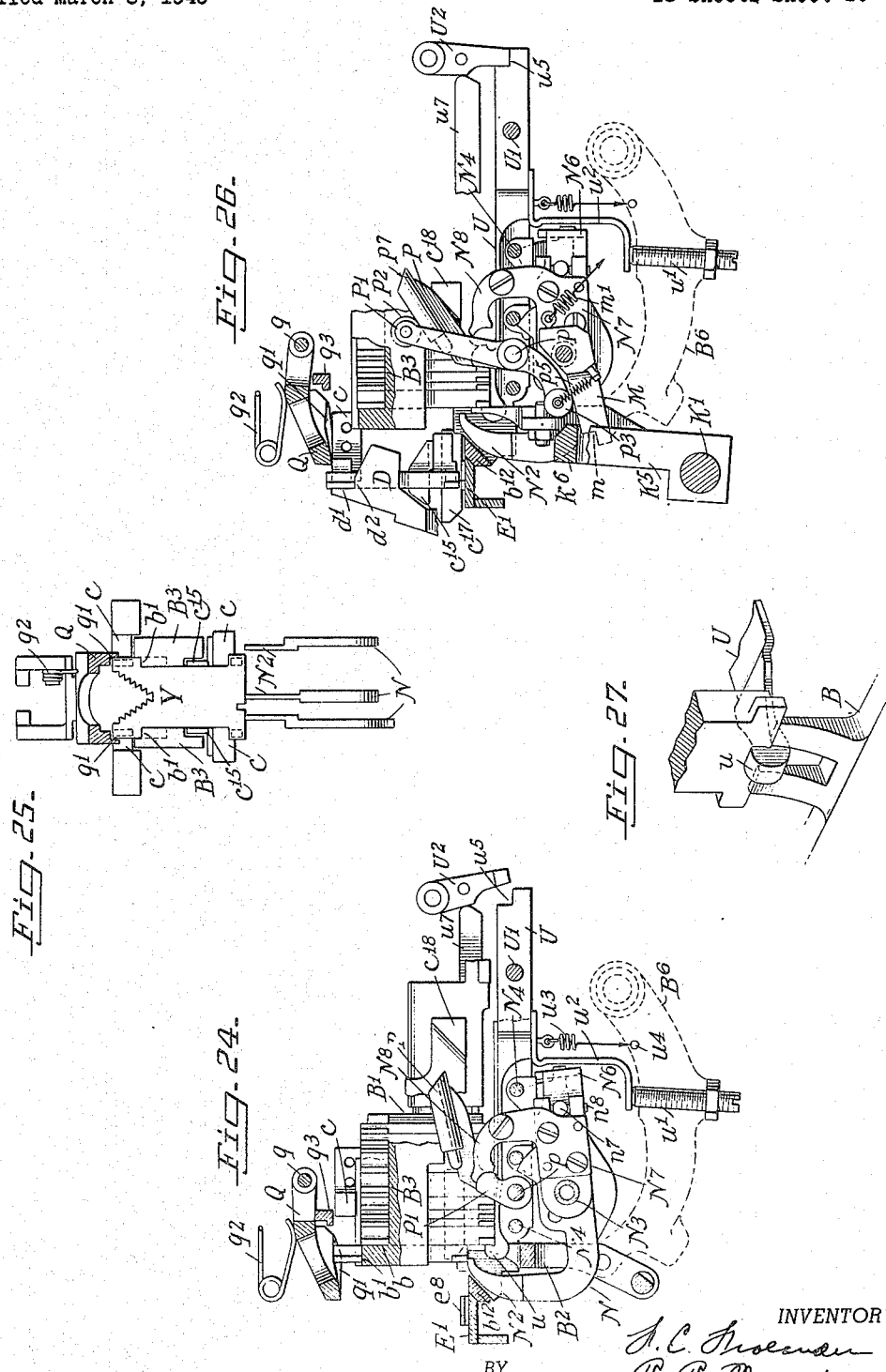

Sept. 19, 1950     F. C. FROLANDER ET AL     2,523,109
TYPOGRAPHICAL DISTRIBUTING MACHINE
Filed March 8, 1945                       18 Sheets-Sheet 15
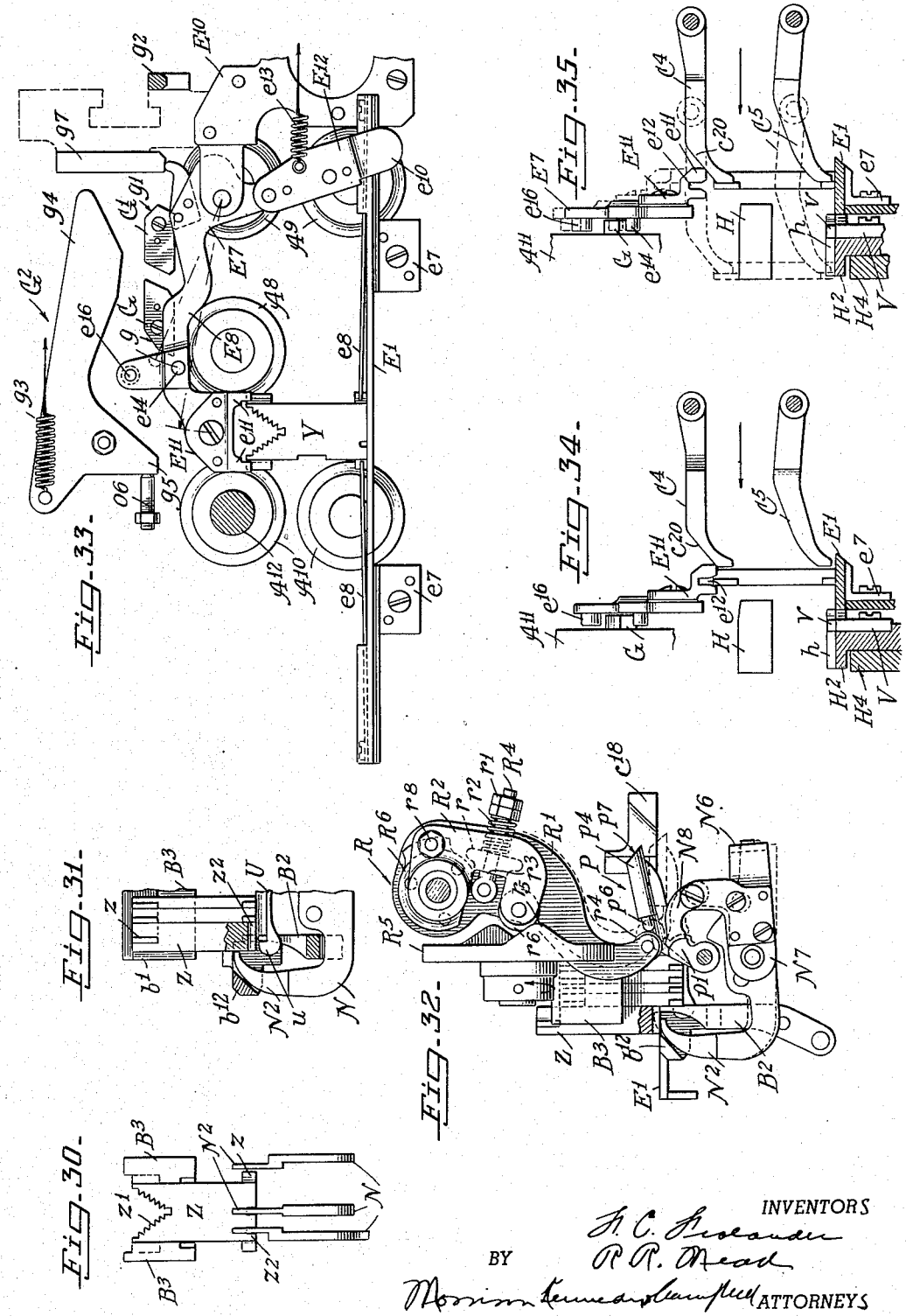

Sept. 19, 1950  F. C. FROLANDER ET AL  2,523,109
TYPOGRAPHICAL DISTRIBUTING MACHINE
Filed March 8, 1945  18 Sheets-Sheet 16
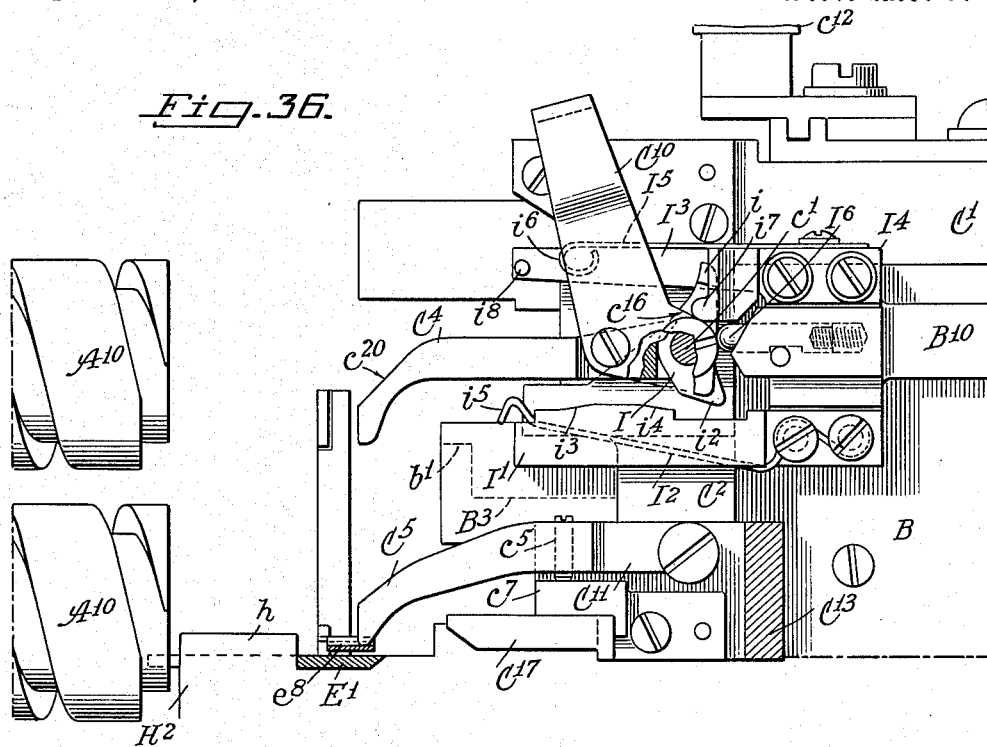
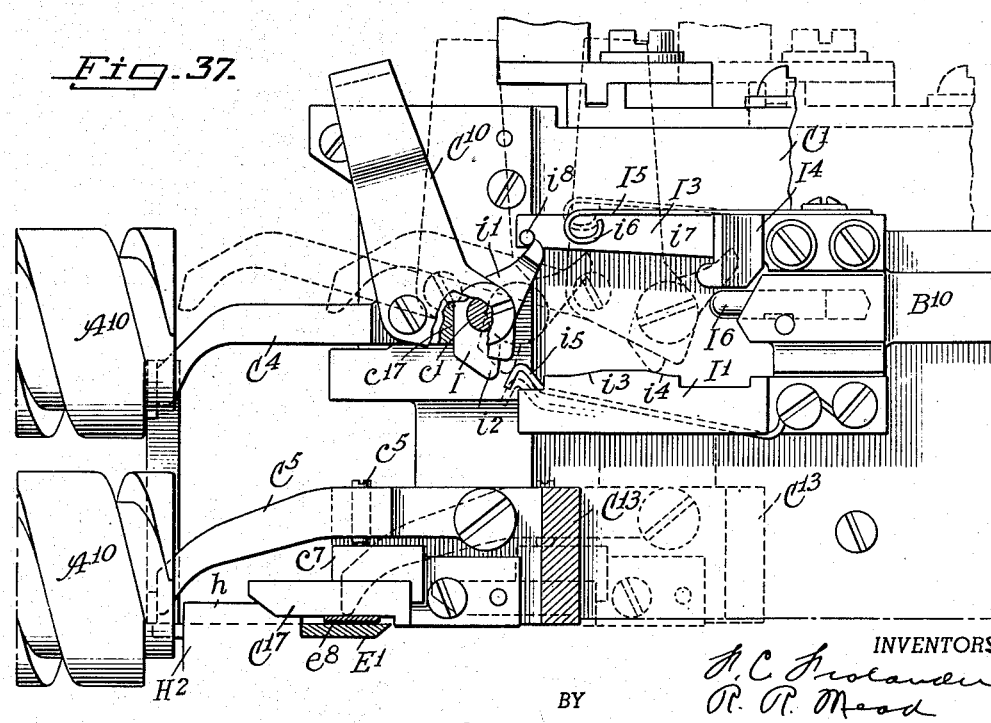
INVENTORS
F. C. Frolander
R. R. Mead
BY
Morrison, Kennedy, Campbell ATTORNEYS Sept. 19, 1950 F. C. FROLANDER ET AL 2,523,109
TYPOGRAPHICAL DISTRIBUTING MACHINE
Filed March 8, 1945 18 Sheets-Sheet 17
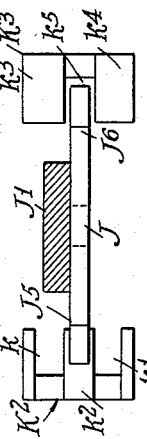
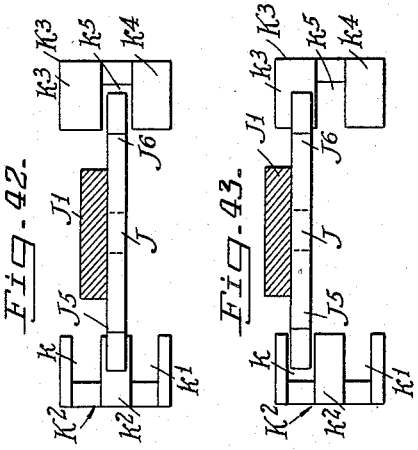
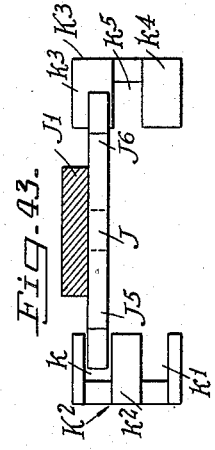
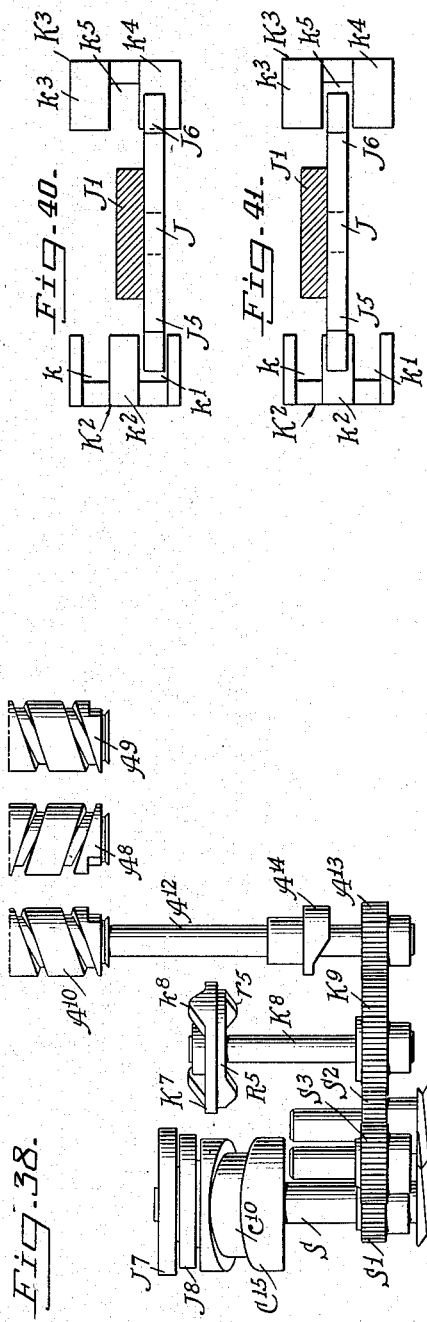
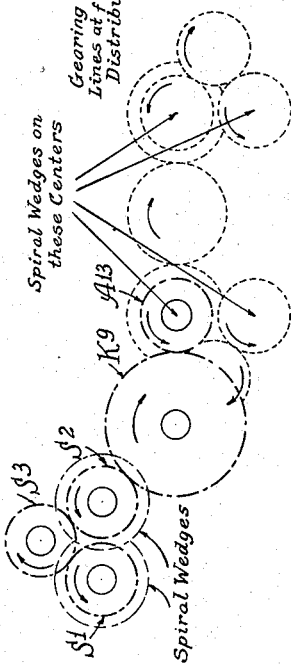
INVENTORS
BY
ATTORNEYS

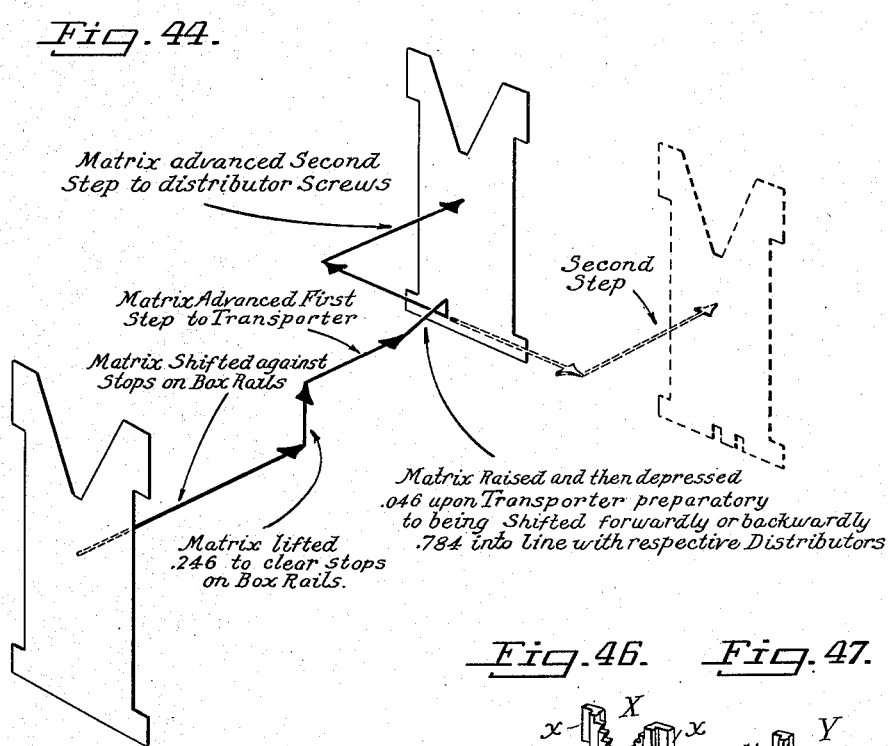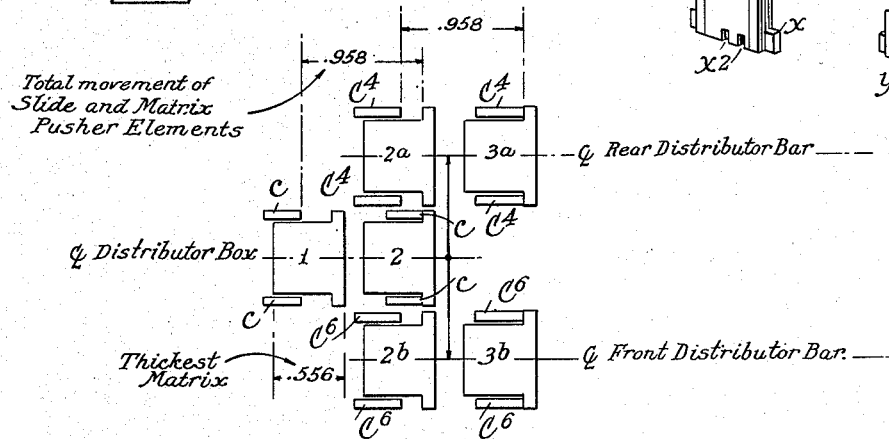

Patented Sept. 19, 1950

2,523,109

UNITED STATES PATENT OFFICE 2,523,109

TYPOGRAPHICAL DISTRIBUTING MACHINE

Frank C. Frolander, Elizabeth, N. J., and Richard R. Mead, Queens Village, N. Y., assignors to Mergenthaler Linotype Company, a corporation of New York Application March 8, 1945, Serial No. 581,680

80 Claims. (Cl. 199—41)

This invention relates to typographical distributing machines, such as Linotype machines of the general organization represented in U. S. Letters Patent No. 436,532 to O. Mergenthaler, wherein circulating matrices are released from a magazine in the order in which their characters are to appear in print and then compose the line, the composed line transferred to the face of a slotted mold, the mold filled with molten metal to form a slug or linotype against the matrices which produce the type characters thereon, and the matrices thereafter returned through a distributing mechanism to the magazine from which they started. More particularly, it relates to machines for handling matrices of different form and equipped with two relatively fixed magazines or with a series of magazines movable as a unit in the machine framework to bring different pairs into use, the distributing mechanism being capable of serving both magazines of a selected pair simultaneously so that the matrices released therefrom may be mixed in the same line and, after the slug casting operation, restored to their proper magazines.

Broadly speaking, the invention is directed to an improved distributing mechanism which includes two fixed character distributors arranged side by side and means whereby the matrices, as they are successively detached from a composed line, are delivered according to form to one distributor or the other. In the present instance, the matrix delivery means comprise an advancing member and a reciprocating transporter, the advancing member being adapted to push the detached matrices from a distributor box into engagement with a pair of retractible receiving rails located at a relay station midway between the distributors, and the transporter being operative in one or the other of two zones to carry the matrices from the relay station into transfer relation to the appropriate distributors.

During a pause in the operation of the transporter, the rails are withdrawn from their receiving position so as to release the matrices for engagement with the transporter; and coincident with this operation, an overhead spring-actuated clamping device, arranged in operative relation to the upper edges of the matrices, is allowed to function, first, to prevent the displacement of the matrices as they are stripped off the rails and, then, to hold the matrices firmly upon the transporter while en route from the relay station to the appropriate transfer station. Upon the arrival of a matrix at its transfer station, the clamping device is disengaged and the matrix immediately transferred from the transporter to the distributor, this latter operation taking place simultaneously with the advance of the next following matrix to the relay station, whereby distribution of the matrices may be carried on continuously or without interruption until the flow of detached matrices from the distributor box has ceased.

Provision is made to determine the destination of the detached matrices before they arrive at the relay station and, for this purpose, the distributor box is equipped with a plurality of form distinguishing elements arranged into engaging relation to the lower ends of the matrices. In the preferred embodiment illustrated, the distinguishing elements are pivotally mounted on a common axis and are also capable of individual bodily adjustment in order to register with the customary font or bridge notches in those matrices destined for one of the distributors. Those matrices destined for the other distributor, and whose font or bridge notches do not register with the distinguishing elements, are adapted as they are detached from the line to rock said elements out of the way, and this rocking movement is imparted to a conditioning agent by means of which the zone of operation of the transporter is selected.

These and other features of the improved distributing mechanism, as well as the construction of the parts involved and the manner in which they cooperate, will be more readily understood from the detailed description to follow.

In the accompanying drawings, the invention has been shown merely in preferred form and by way of example, and obviously many changes and variations may be made therein without departure from its scope. It should be understood, therefore, that the invention is not limited to any specific form or embodiment except insofar as such limitations are specified in the appended claims.

Referring to the drawings:

Fig. 6 is an end elevation, partly in section, of the two distributors, showing the magazine entrances and the manner of supporting and guiding the matrices as they are transferred to the distributor screws;

Fig. 7 is a horizontal section taken on the line 7—7 of Fig. 6, showing the improved screw bearings;

Fig. 8 is an elevation, partly in section, showing the actuating mechanism and control element for the transporter;

Figs. 9 and 10 are end elevations, partly broken away, of the parts shown in Fig. 8 and depicting the control element for the transporter in its different positions and the automatically controlled trip pawl therefor;

Fig. 11 is a vertical section taken on the line 11—11 of Fig. 4, showing the relative position of the parts of both the distributor box and transporter when the matrix advancing member has completed its return stroke;

Fig. 12 is a fragmentary view showing a detached matrix clearing the form distinguishing elements and the conditioning agent locked against accidental displacement;

Fig. 13 is a view similar to Fig. 12 but showing the relative position of the parts when the matrix advancing member completes its active stroke to transfer a matrix from the transporter to the front distributor and to advance the next following matrix into engagement with the retractible rails;

Fig. 14 is a vertical section through the distributor box showing the overhead matrix guide plate, the auxiliary stop member and the controlling devices therefor;

Fig. 15 is a rear elevation, on an enlarged scale, of the actuating lever for the retractible rails and other parts adjacent thereto;

Fig. 16 is a vertical section of the parts taken on the line 16—16 of Fig. 15;

Fig. 17 is a detail front elevation of certain parts shown in Figs. 15 and 16;

Fig. 18 is a perspective view of the matrix advancing member and parts carried thereby;

Fig. 19 is an end elevation of the distributor box, with the mechanism supported thereby;

Fig. 20 is a horizontal section taken on the line 20—20 of Fig. 19;

Figs. 21, 22 and 23 are detail views showing the three form distinguishing elements and the manner in which they are connected with their individual adjusting rods;

Fig. 24 is a rear elevation, partly in section, of a portion of the distributor box, showing the relative position of the parts when the form distinguishing elements are actuated by a detached matrix;

Fig. 25 is a detail end elevation, partly in section, of certain parts shown in Fig. 24;

Fig. 26 is a view similar to that of Fig. 24 but including additional parts to illustrate the manner of actuating the trip pawl to institute a change in the zone of operation of the transporter;

Fig. 27 is a detail fragmentary perspective view showing the auxiliary stop member and matrix lifting finger in operative relation to a matrix engaging said member;

Figs. 30 and 31 are detail views to show how a "back-milled" matrix, irrespective of its form, will always actuate the form distinguishing elements;

Fig. 32 is an elevation, taken from the rear, showing the means tending to restore the conditioning agent and form distinguishing elements to their normal position prior to the advance of a matrix to the relay station;

Fig. 33 is a fragmentary elevation showing a matrix shifted by the transporter into transfer relation to the rear distributor and also the relative position of the clamping device to its sustaining cam plates, just before it is disengaged from the matrix;

Figs. 34 and 35 are detail views showing the manner in which the clamping member is disengaged from a matrix prior to its transfer from the transporter to the appropriate distributor;

Fig. 36 is a side elevation, on an enlarged scale and partly in section, of a portion of the distributor box and matrix advancing member, and showing the tilting devices for the upper transfer fingers of said member;

Fig. 37 is an elevation similar to Fig. 36 showing, by the full lines, the position of the matrix transfer fingers as the matrix advancing member completes its active stroke and indicating, by the dotted lines, the position they are caused to assume during the return stroke of said member;

Fig. 38 is a detail plan view showing the driving mechanism for various parts;

Fig. 39 is a diagrammatic view of the gearing arrangement;

Figs. 40 and 41 are detail plan views, partly in section, showing the transporter control element in its different operative positions under one setting;

Figs. 42 and 43 are views similar to Figs. 40 and 41 but showing the transporter control element in corresponding positions under another setting;

Fig. 44 is a diagrammatic perspective view indicating the different steps a detached matrix is caused to take in its delivery from the distributor box to the appropriate distributor;

Fig. 45 is a diagrammatic view showing the six different positions detached matrices of maximum thickness will be caused to assume during their delivery from the distributor box to the appropriate distributors and the relation they will bear to the transfer fingers when moved to such positions; and Figs. 46 and 47 are detail perspective views of matrices of two different forms.

Distributors

As best shown in Fig. 6, there are two main or character distributors $A^1$, $A^2$, arranged side by side and connected respectively to a pair of superposed magazines $A^3$, $A^4$, by intervening channel entrances $A^5$, $A^6$. Each distributor comprises, as usual, a horizontal toothed bar $A^7$ and a plurality of screws arranged parallel to the bar and adapted to advance the matrices therealong until they are released above their appropriate magazine channels. The distributor screws, five in number, include a single inside screw $A^8$, common to both distributors, and two pairs of front and rear outside screws $A^9$ and $A^{10}$, respectively. Due to limitations in space, all of the distributor screws, with the exception of the upper rear screw $A^{10}$, are journaled on bearing studs $a$ (Fig. 7) which project from fixed brackets $A^{11}$ into sleeve-lined bores $a^1$ drilled into the contiguous ends of the screws. The excepted screw $A^{10}$ (see also Fig. 38) is formed with a shaft extension $A^{12}$ equipped with a driving pinion $A^{13}$ and also with a face cam $A^{14}$, the purpose of which will later appear.

Matrices

The regular matrices X and Y (Figs. 46 and 47) are provided as usual with upper and lower projecting ears $x$, $y$ and also with the customary tooth combination webs $x^1$, $y^1$, but they differ in form, as may be observed, due to the number and location of the distinguishing notches $x^2$, $y^2$ in their lower edges. The special or so-called "back-milled" matrices Z, shown in Figs. 30 and 31, are provided with upper and lower projecting ears $z$ and tooth combination webs $z^1$ and, because of the location of their distinguishing notches $z^2$, correspond in form with the matrices X. However, unlike both matrices X and Y, the matrices Z have their projecting ears (for reasons well known to the art) spaced or set back from their leading side faces.

Distributor box

Figure 1:
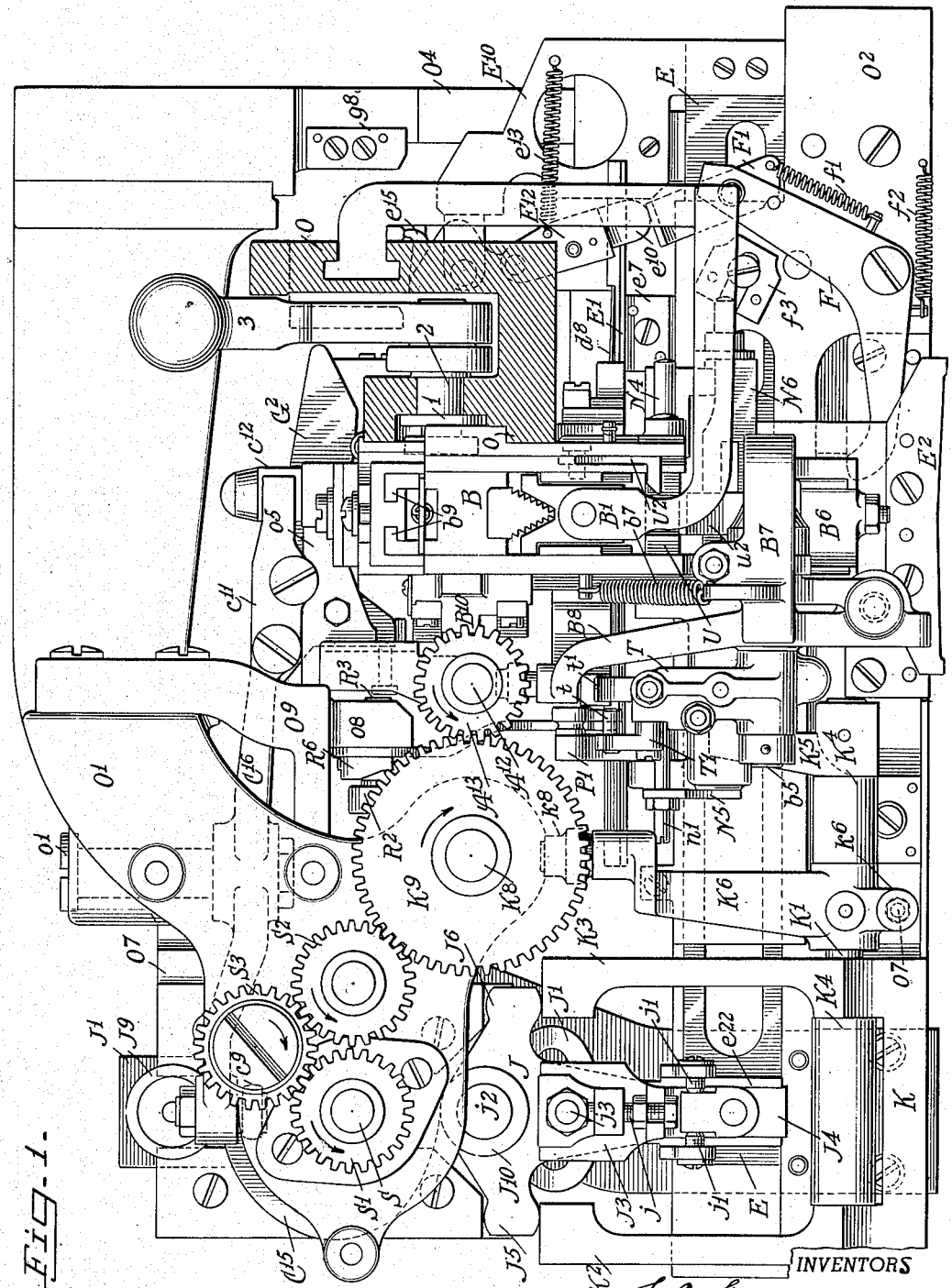
Fig. 1 is an end elevation, partly in section, of the improved distributing mechanism, showing the driving connections and the general relation of the parts.

After the casting operation, a composed line of matrices is lifted to the distributing mechanism by a second elevator (not shown) and transferred therefrom to a distributor box B by a shifter or pusher $B^1$ slidably mounted in a fixed cross beam O of the framework. The distributor box B (Figs. 1 and 24) is removably mounted on a ledge $o$ of the beam O and is locked in place in the usual way by the partial rotation of a wedge cam 1 arranged above the ledge and engaging a corresponding recess formed in one of the side walls of the box. The cam 1 is secured to one end of a short rock shaft 2 and is operable by a crank handle 3 keyed to the other end of the shaft.

Figure 2:
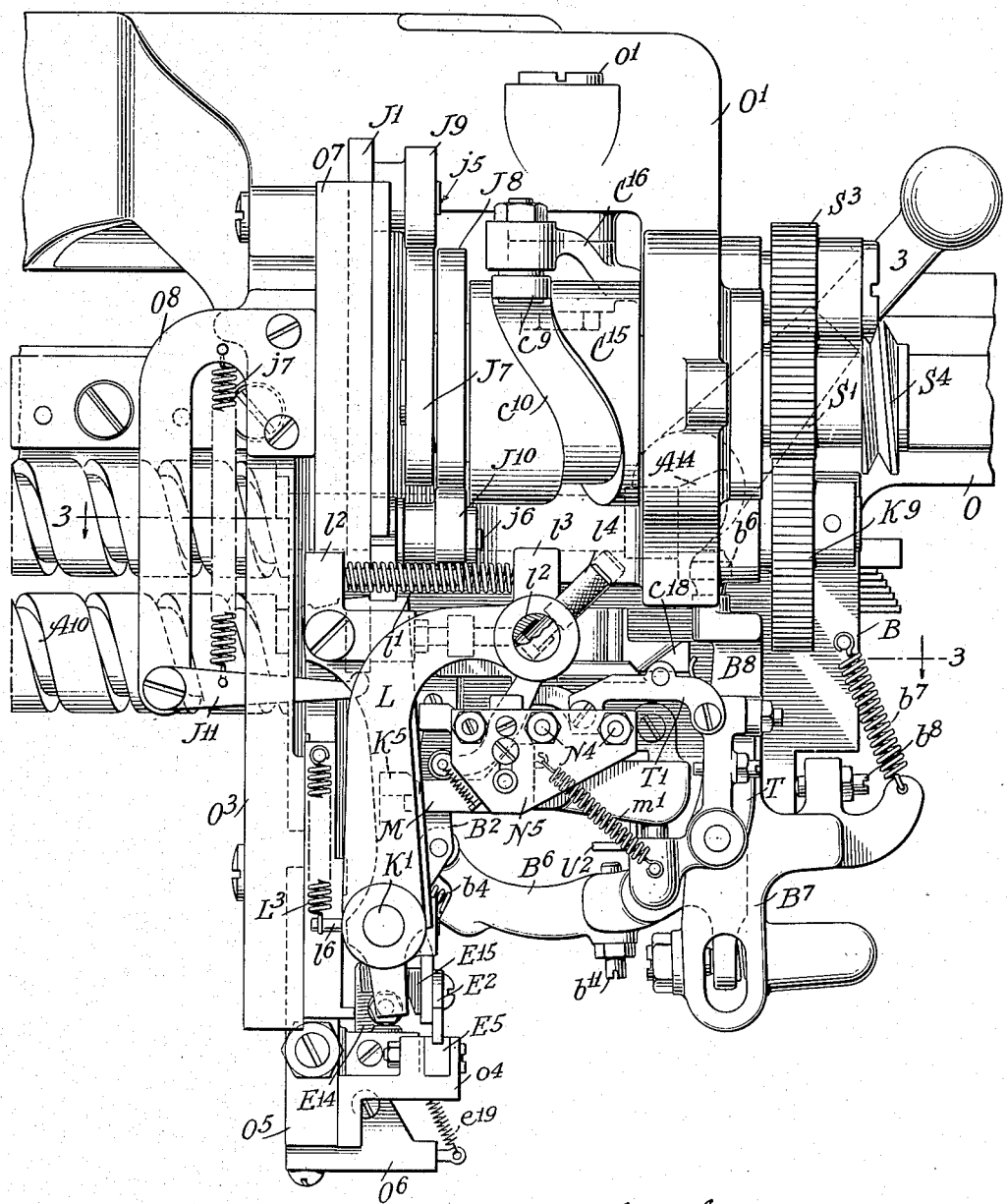
Fig. 2 is a side elevation thereof.

As best shown in Figs. 13, 14 and 19, the box is equipped with a reciprocating matrix lifting finger $B^2$ and with upper and lower matrix supporting rails $B^3$ and $B^4$, respectively, which present vertical stop shoulders $b$ for arresting each leading matrix of the line by its projecting ears in engaging relation to the lifting finger. At each successive cycle of operation, an arrested matrix is raised by the finger $B^2$ above the stop shoulders $b$ and, as it clears them, it is pushed ahead under the influence of the shifter $B^1$ a slight distance, determined by its own thickness, along upper short rail sections $b^1$ of the rails $B^3$. The lifting finger $B^2$ (Figs. 11 and 13) is pivotally connected to the horizontal arm $B^6$ of a split bell crank lever $B^7$, being provided at its opposite sides with a pair of set screws $b^2$ adapted, through their engagement with a flat cross bar $b^3$ of the distributor box, to sustain the finger in its operative position against the influence of a small compression spring $b^4$. The lever $B^7$ is pivoted on a fixed stub shaft $b^5$ and is movable in a clockwise direction (having reference to Figs. 11 and 13), to raise the finger, by the rotary face cam $A^{14}$, the latter (as indicated by the dotted lines in Fig. 2) being arranged to engage an anti-friction roller $b^6$ carried by the vertical arm $B^8$ of the lever. Movement of the lever $B^7$ in the opposite or counter-clockwise direction, to lower the finger, is effected by a pull spring $b^7$; and an adjustable banking screw $b^8$, mounted in an offset portion of the lever $B^7$ and engaging a depending projection of the box, determines the lowermost position of the finger.

Matrix advancing member

As a matrix is detached from the line by the lifting finger $B^2$, it is advanced to a relay station, located midway between the distributors, by the operation of a constantly reciprocating member C slidably mounted upon the distributor box B. Basically, the member C (Figs. 1, 18 and 19) comprises an elongated horizontal body portion $C^1$ and a pair of rigid side plates $C^2$, $C^3$ fastened thereto and depending from the leading end thereof. The body portion $C^1$ is undercut and grooved longitudinally to engage a pair of angular rails $b^9$ rising from the top wall of the distributor box and adapted to support and guide the member C during its reciprocations.

As shown best in Fig. 18, the member C is equipped with a set of four pusher blocks $c$ disposed in pairs and projecting inwardly from the side plates $C^2$, $C^3$ in engaging relation to the upper and lower projecting ears of a detached matrix supported on the short rail sections $b^1$. The equipment for the member C also includes two corresponding sets of matrix transfer fingers arranged in advance of the pusher blocks $c$, one set comprising an upper pair of parallel fingers $C^4$ and a single lower finger $C^5$, and the other set comprising an upper pair of parallel fingers $C^6$ and a single lower finger $C^7$. For reasons later to be explained, the fingers $C^4$ and $C^6$ are formed with upwardly inclined cam surfaces $c^{20}$ and are integral with arms $C^8$, $C^9$ arranged adjacent the outer side faces of the depending plates $C^2$, $C^3$ and connected thereto by individual pivot screws $c^1$, $c^2$. The arms $C^8$ and $C^9$ are joined together by an overhead strap or bail $C^{10}$, whereby the fingers $C^4$ and $C^6$ may be rocked upwardly and downwardly in unison. A fixed projection $c^3$, which underlies a single banking screw $c^4$ carried by the arm $C^9$, serves to locate the fingers $C^4$ and $C^6$ in their lower or normal matrix engaging position. Like the upper fingers, the two lower fingers $C^5$ and $C^7$ are integral with arms $C^{11}$ and $C^{12}$, respectively, the arm $C^{11}$ being pivotally mounted on an angular bracket plate $C^{13}$ secured to the side plate $C^2$, and the arm $C^{12}$ being similarly mounted on a spacing block $C^{14}$ secured to the side plate $C^3$. The fingers $C^5$ and $C^7$ are sustained in their lower or normal position through the medium of individual banking screws $c^5$, $c^6$ mounted in the arms $C^{11}$ and $C^{12}$ and engaging corresponding flanges $c^7$, $c^8$ at the lower ends of the depending side plates.

Operation of the reciprocating member C (Figs. 1 and 2) is controlled from a constantly-driven grooved cam $C^{15}$ through an intervening lever $C^{16}$ mounted on a fixed vertical stud $o^1$ in a main supporting bracket $O^1$. At one end, the lever $C^{16}$ is provided with a roller $c^9$ engaging the groove $c^{10}$ of the cam $C^{15}$; and at the other end, it is provided with a forked element $c^{11}$ normally engaging an upright swivel post $c^{12}$ rising from the horizontal body portion $C^1$ of the member C. The forked element $c^{11}$ is preferably hinged to the lever $C^{16}$, as shown, to permit its disengagement from the swivel post $c^{12}$ when it is desired to remove the distributor box. A pull spring $c^{13}$ (Fig. 13), anchored to a fixed cross bar $b^{10}$ of the distributor box and attached to a screw stud $c^{14}$ in the body portion of the member C, urges the roller $c^9$ against the leading side face of the cam groove $c^{10}$ and thus insures accuracy and smoothness in the operation of the parts.

Receiving rails and transporter

Matrices advanced to the relay station by the reciprocating member C are received by a pair of retractible rails D rising from the opposite sides of a rocker plate $D^1$ and presenting upwardly inclined or cam surfaces $d$ to the upper projecting ears of the matrices (see Figs. 11, 13, 15 and 16). Beyond the cam surfaces $d$, the rails are formed with vertical stop shoulders $d^1$ and intervening horizontal surfaces $d^2$, so that matrices pushed into engagement with the rails, first will be cammed upwardly and then come to rest in a vertical position against the stop shoulders. In such position of the matrices, their bottom edges will be located directly over a shelf $E^1$ which is carried by a reciprocating transporter E slidably mounted in an elongated, horizontal bracket $O^2$ secured to depending side members $O^3$, $O^4$ of the distributor frame. After leaving the short rail sections $b^1$ of the box rails $B^3$ and before they engage the receiving rails D, the matrices are adapted to cross a relatively short underlying bridge bar $b^{12}$ arranged flush with the shelf $E^1$ of the transporter and secured to the box frame, the matrices at such moments being properly guided from above, by means later to be described and restrained against edgewise displacement by a pair of upright confining flanges $c^{15}$ carried by the advancing member C.

As best shown in Figs. 15 and 16, the rocker plate $D^1$ is pivotally attached at its lower extremity to a small angular bracket $D^2$, so that it may be swung forwardly and backwardly to carry the rails to and from their matrix receiving position. Operation of the rocker plate is effected by a bell crank lever $D^3$ pivotally mounted in a depending member $O^5$ of the bracket $O^2$ and having a relatively long vertical arm $D^4$ rising alongside the rear face of the bracket and connected to the rocker plate by means of a cross pin $d^3$. In the embodiment illustrated, the lower portion of the rocker plate $D^1$ is bifurcated to fit over the upper end of the arm $D^4$, and the cross pin $d^3$ is mounted in the arm and projects therefrom through the two branches of the rocker plate.

To prevent possible displacement of the matrices after they engage the rails D, the rocker plate $D^1$ is equipped with a pair of gripper fingers $D^5$ pivoted on the cross pin $d^3$ and arranged beneath the rails in engaging relation to the lower projecting ears of the matrices. The fingers $D^5$ are integrally connected together by a web plate $D^6$ which extends forwardly beneath the shelf of the transporter E and is apertured transversely to receive the upper end of an elongated wire spring $d^4$ anchored at its lower end to a pin $d^5$ in the lever arm $D^4$. When the rails D occupy their active position the spring $d^4$ serves to rock the fingers downwardly into engagement with the lower ears of a matrix supported on said rails (see Fig. 16). However, when the rails are retracted, the gripper fingers $D^5$ will be sustained against the tension of the spring $d^4$ in their raised position shown in Fig. 11 by the engagement of a protuberance $d^6$, formed on the bottom of the web plate $D^6$, with a forward projection $d^7$ of the bracket $D^2$.

Figure 4:
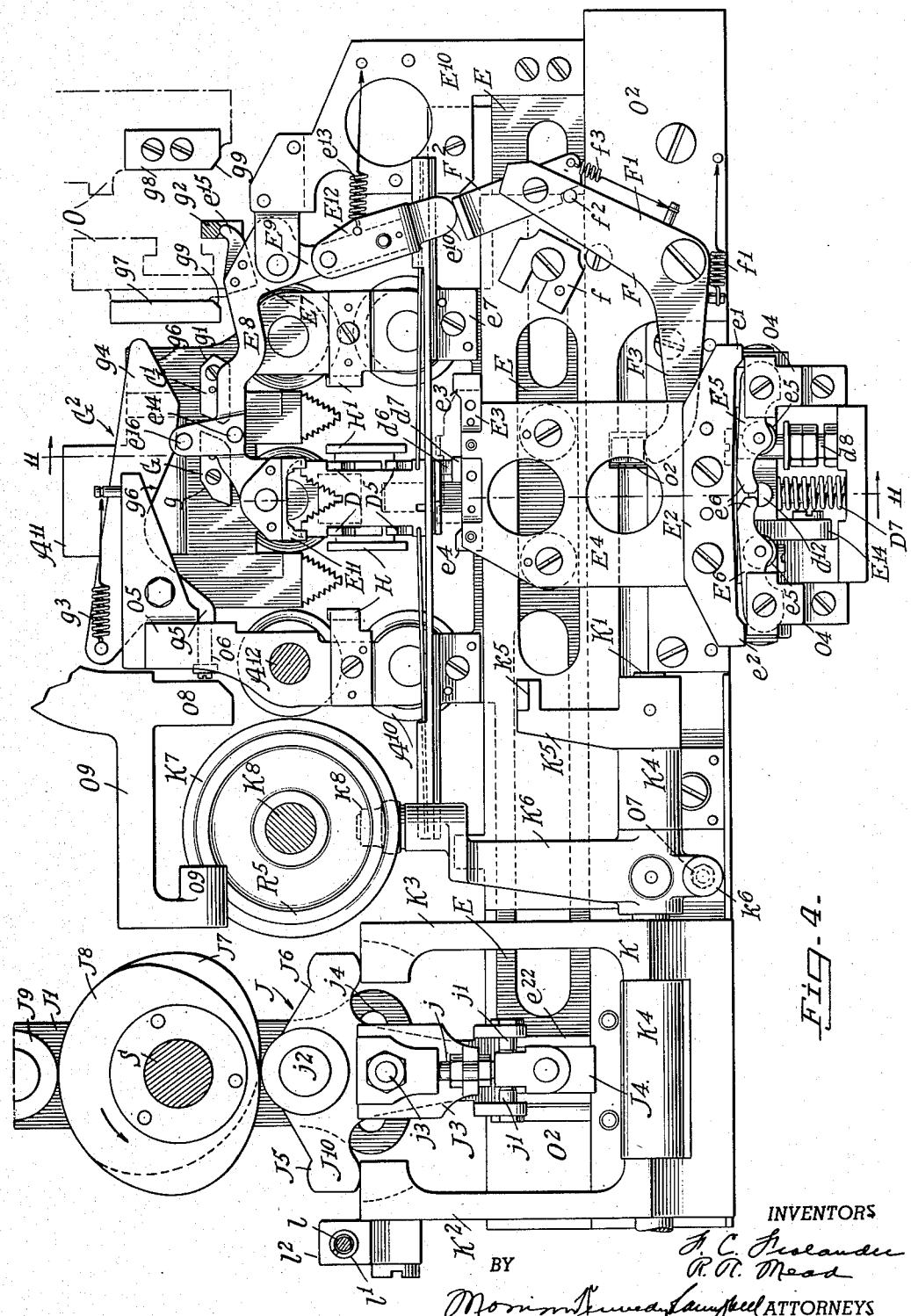
Fig. 4 is a front elevation, partly in section, of the matrix transporter, its actuating devices and parts associated therewith, and showing a matrix supported and sustained in upright position upon the transporter by the overhead clamping member.
Figure 5:
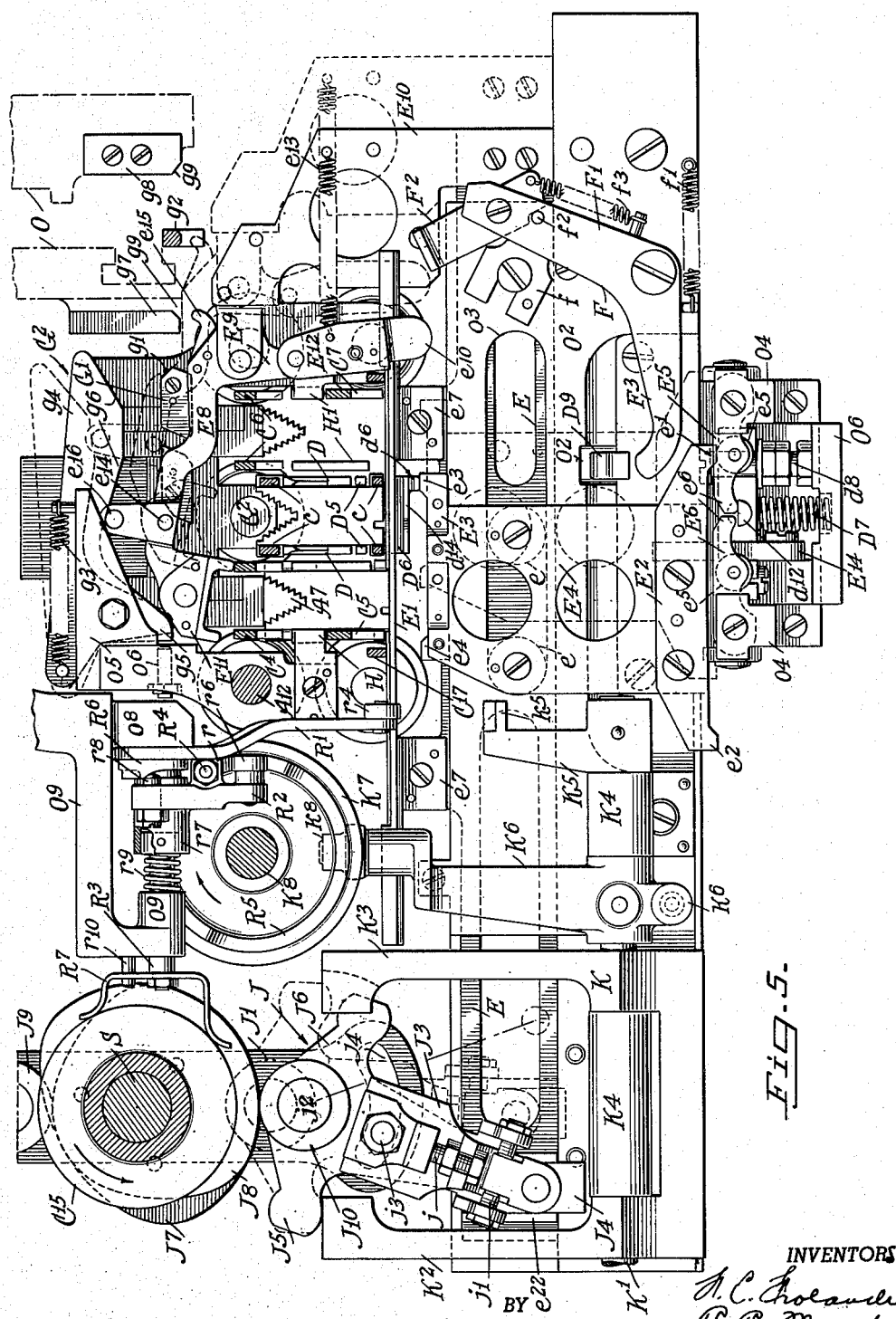
Fig. 5 is an elevation similar to Fig. 4 but showing by the full lines the matrix shifted to the left in transfer relation to the rear distributor and the next following matrix supported on the retractible rails at the relay station, and indicating by the dotted lines the position of certain parts carried by the transporter just before it completes its return stroke.
Figure 28:
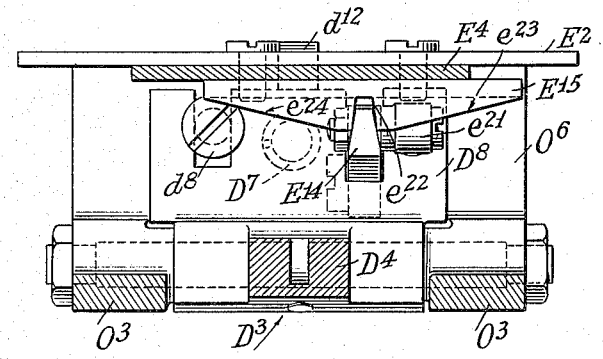
Fig. 28 is a horizontal section taken on the line 28—28 of Fig. 15.

The lever $D^3$ is movable in a counter-clockwise direction (Fig. 13), to effect a retraction of the rails D and gripper fingers $D^5$, by a relatively strong expansion spring $D^7$ arranged between the shorter horizontal arm $D^8$ of the lever and an underlying flange $O^6$ of the bracket member $O^5$ (see also Figs. 4 and 5). Movement of the lever $D^3$ in said direction is limited by the head of a stop screw $d^8$ rising from the flange $O^6$ and engaging a vertical slot formed in the front edge of the arm $D^8$ (Figs. 4, 5 and 28).

The vertical arm $D^4$ of the lever $D^3$ carries a latch $D^9$ pivotally mounted on the pin $d^5$ and projecting forwardly therefrom into an aperture $o^2$ in the horizontal bracket $O^2$. The latch $D^9$ is formed with a hooked nose portion $d^9$ and provided with a light pull spring $d^{10}$ anchored to the hub of the lever $D^3$. When the rails D are retracted and the lever $D^3$ occupies the position shown in Fig. 11, the nose portion of the latch $D^9$ will be held by the spring $d^{10}$ upon the lower wall of the aperture $o^2$ but, when the lever $D^3$ is moved in a clockwise direction to rock the rails D to their matrix receiving position, the nose portion $d^9$ is adapted to drop in front of said wall and thus hold the parts in said position against the pressure of the expansion spring $D^7$ (see Fig. 13). In order to locate the rails D at this time in the proper angular position, the rocker plate $D^1$ is provided with an adjustable banking screw $d^{11}$ (Fig. 16) arranged to engage the rear face of a fixed vertical plate $D^{10}$ located directly behind a matrix supported on the rails and secured to the lower portion of the bearing block for the inside distributor screw $A^8$.

Actuation of the latch $D^9$, to release the lever $D^3$, is effected by a bell crank lever F (Figs. 4 and 5) pivoted to the front face of the bracket $O^2$ and held yieldingly in its normal position against an adjustable stop piece $f$ by a pull spring $f^1$ connected to the lever and anchored to the said bracket. For reasons later to be mentioned, one arm $F^1$ of the lever F is equipped with an angularly disposed detent plate $F^2$ and the other arm $F^3$ thereof terminates immediately below the latch $D^9$ so as to disengage it when the lever F is rocked away from the stop $f$ against the tension of the spring $f^1$. The detent plate $F^2$ is pivotally mounted between its ends near the outer extremity of the arm $F^1$ and arranged so as to be capable of movement relatively thereto in one direction only, movement in the other direction being prevented by a stud $f^2$ projecting laterally from the arm $F^1$ and adapted to sustain the detent in opposition to a spring $f^3$ in the angular position shown in Fig. 5.

The clockwise movement (Fig. 16) of the lever $D^3$ and the rocking movement of the gripper fingers $D^5$ into engagement with the lower projecting ears of the matrices are controlled, respectively, by a cam plate $E^2$ and a sustaining bar $E^3$, both of which are fastened to a rectangular supporting member $E^4$ carried by the reciprocating transporter E. As best shown in Figs. 5 and 11, the supporting member $E^4$ is located in front of the horizontal bracket $O^2$ and secured to a pair of spaced apart bosses $e$ protruding forwardly from the transporter E through an elongated clearance slot $o^3$ in said bracket. The cam plate $E^2$ is arranged substantially flush with the lower edge of the member $E^4$ except that it is formed at its opposite ends with depending beveled lugs $e^1$ and $e^2$; and the bar $E^3$ is arranged flush with the upper edge of said member except that it is formed at its opposite ends with upstanding beveled portions $e^3$ and $e^4$. During the operation of the transporter, the lugs $e^1$, $e^2$ are adapted to actuate one or the other of a pair of twin levers $E^5$, $E^6$, aligned horizontally with each other and provided with anti-friction rollers $e^5$ disposed in the path of the lugs. The levers $E^5$ and $E^6$ are hingedly mounted in corresponding brackets $o^4$ and have their opposed end portions $e^6$ resting upon a flattened stud $d^{12}$ carried by the shorter horizontal arm $D^8$ of the rocking lever $D^3$.

The transporter E is operative in one or the other of two zones to carry the matrices X or Z in one direction from the relay station into transfer relation to the front distributor $A^2$, or the matrices Y from said station in the opposite direction into transfer relation to the rear distributor $A^1$.

As the transporter E completes its active stroke in the zone between the relay station and the transfer station for the rear distributor $A^1$ (see Fig. 5), the lever $E^5$ will be actuated by the lug $e^1$ of the cam plate $E^2$ and, through its engagement with the stud $d^{12}$, will operate the lever $D^3$ and cause the latter to rock the receiving rails D forwardly to their active position. At this time, the high portion $e^3$ of the bar $E^3$ will have reached a position directly in front of the projection $d^7$ of the small bracket $D^2$ so as to furnish support for the gripper fingers $D^5$, through the protuberance $d^6$ of their connecting web plate $D^6$, and thus maintain them in their raised position (Fig. 13) out of the path of the lower projecting ears of the next following matrix as it is advanced into engagement with the rails D.

When the transporter is operative in the other zone, between the relay station and the transfer station for the front distributor $A^2$, a similar result will be accomplished, the lever $E^6$ at such times being actuated by the lug $e^2$ of the cam plate $E^2$, and the high portion $e^4$ of the bar $E^3$ being positioned in front of the projection $d^7$ as the transporter completes its active stroke.

Immediately after the transporter starts its return stroke from one or the other transfer station, the high portion $e^3$ or $e^4$ of the bar $E^3$ will be carried from its position beneath the protuberance $d^6$ and permit the gripper fingers $D^5$ to function in the manner already stated. While the lug $e^1$ or $e^2$ simultaneously will also be carried out of engagement with the corresponding lever $E^5$ or $E^6$, the latch $D^9$ will prevent the operation of the lever $D^3$ until the transporter completes its return stroke. The lever F then will be actuated, by means presently to be described, to lift the latch and permit the spring $D^7$ to effect a retraction of the rails D and the gripper fingers $D^5$. By this latter operation, the gripper fingers will be cammed upwardly out of contact with the lower projecting ears of a matrix supported on the rails D, by the engagement of the protuberance $d^6$ with the bracket extension $d^7$, and the matrix thereupon will be stripped off the rails by the aforementioned stationary plate $D^{10}$, so that it may be deposited upon the underlying shelf $E^1$ of the transporter E (Fig. 11).

The shelf $E^1$ is attached to the body of the transporter through intermediate spaced-apart bracket plates $e^7$ (Fig. 5), and is furnished with a pair of elongated leaf spring elements $e^8$ adapted to prevent skidding or other displacement of the matrices as they are deposited upon the shelf. The spring elements $e^8$ (Figs. 3 and 4) are fastened to the shelf $E^1$ at their outer extremities, and are formed at their inner free ends with corresponding notches $e^9$ arranged to accommodate the lower projecting ears of the matrices.

The equipment for the transporter also includes an irregularly shaped lever $E^7$ having horizontal and vertical arms $E^8$ and $E^9$, respectively, and pivotally mounted on an upstanding bracket member $E^{10}$ secured to one end of the transporter. The arm $E^8$ overlies the shelf $E^1$ and, at its outer end, is provided with a clamping member $E^{11}$ for holding the matrices in upright position upon the shelf during their trip from the relay station into transfer relation to the appropriate distributor. The other arm $E^9$ of the lever $E^7$ carries a depending extension $E^{12}$ terminating below the shelf in an offset rounded end portion $e^{10}$ arranged to engage the detent plate $F^2$ of the lever F. As best shown in Figs. 34 and 35, the clamping member $E^{11}$ presents a pair of side lugs $e^{11}$ having corresponding notches $e^{12}$ extending transversely therethrough and flared at their lower ends to partially embrace, from above, the upper projecting ears of the matrices as they are stripped off the rails D.

The lever $E^7$ is actuated by a pull spring $e^{13}$ attached to the extension $E^{12}$ of the arm $E^9$, and its operation is controlled by one or the other of a pair of horizontally disposed cam plates G, $G^1$ which are fastened, respectively, to the adjacent bearing brackets for the distributor screws $A^8$, $A^9$ and arranged in engaging relation to a stud $e^{14}$ projecting rearwardly from the arm $E^8$ of the lever $E^7$. At their outer ends, the cam plates G, $G^1$ are formed with upwardly inclined or cam surfaces $g$, $g^1$ and have their inner ends spaced sufficiently far apart to permit the stud to pass between them.

During the active stroke of the transporter to carry a matrix Y from the relay station into transfer relation to the rear distributor $A^1$, or a matrix X or Z from the relay station into transfer relation to the front distributor $A^2$, the stud $e^{14}$ will underride the cam plate G or $G^1$ and reach a position slightly beyond it as the transporter pauses at the transfer station. The clamping member $E^{11}$ then will be disengaged from the matrix, in a manner later to be described; and, as the transporter starts its return stroke, the stud $e^{14}$ will be caused to engage the inclined surface $g$ or $g^1$ of the cam plates and ride onto the upper edge thereof so as to support the clamping member at the height required, against the influence of the spring $e^{13}$. As the transporter arrives at the relay station, the stud $e^{14}$ is adapted to register with the space between the cam plates and permit the spring $e^{13}$ to swing the lever arm $E^8$ downwardly a limited distance, as determined by the engagement of a finger-like projection $e^{15}$ on the arm with a stop plate $g^2$ secured to the distributor beam O. By this operation (Fig. 4), the latch control lever F is actuated, through the engagement of the extension $E^{12}$ with the detent plate $F^2$, to bring about a retraction of the rails D; and, at the same time, the clamping member $E^{11}$ is swung downwardly into engagement with a matrix stripped off the rails. While the grooves in the side lugs $e^{11}$ of the clamping member are adapted at this moment to engage the upper ears of the matrix, the impact that might otherwise be imparted thereto as a result of such engagement is absorbed by the stop plate $g^2$ through the projection $e^{15}$. As will now be clear, the detent plate $F^2$ primarily is intended, by reason of its ability to yield in one direction, to permit the extension $E^{12}$ of the arm $E^9$ to by-pass the lever F as the transporter returns to the relay station after carrying a matrix X or Z into transfer relation to the front distributor $A^2$.

To overcome the resistance presented by the operation of the lever F and the lifting of the latch $D^9$, and in order that the pull spring $e^{13}$ may be kept at minimum strength, a supplemental spring $g^3$ is employed to give added force to the lever $E^7$ when it is released by the cam plate G or $G^1$. To this end, the spring $g^3$ is anchored to a small auxiliary bracket $o^5$ and connected to a lever $G^2$, arranged above the lever arm $E^8$ and pivotally mounted in said bracket. The longer arm $g^4$ of the lever $G^2$ overlies a second stud $e^{16}$ carried by the lever arm $E^8$, and the shorter arm $g^5$ of the lever $G^2$ is opposed to a fixed stop screw $o^6$ adapted to sustain the lever in its normal position, as shown in Fig. 4. On its lower edge, the arm $g^4$ is formed with a pair of downwardly converging cam surfaces $g^6$ through which it will be cammed upwardly by the stud $e^{16}$ during the return movements of the transporter E to the relay station, whereby sufficient energy will be stored up in the spring $g^3$ to insure the operation of the lever F and the actuation of the latch $D^9$ in the manner required.

It is important that the retraction of the receiving rails D and the operation of the lever $E^7$ be perfectly timed in order that the clamping member $E^{11}$, as it is swung downwardly, will engage the upper projecting ears of a matrix at the moment it is stripped off the rails. Hence, means supplementing the latch $D^9$ are employed for locking the rails D in their receiving position until the nose portion of the latch completely clears the lower wall of the recess $o^2$. Such means, as best shown in Figs. 16 and 17, include a plate $E^{13}$ secured to the front face of the sustaining bar $E^3$ and formed with a pair of spaced-apart lips or flanges $e^{17}$, $e^{18}$ arranged to engage and override a short forward extension $d^{14}$ of the connecting web $D^6$ for the gripper fingers $D^5$. Shortly after the transporter starts its return stroke from the transfer station for the distributor $A^1$ or $A^2$, and while the gripper fingers are held yieldingly engaged under the tension of the spring $d^4$ with the lower projecting ears of a matrix supported on the rails D, the lip $e^{17}$ or $e^{18}$ is adapted to engage the extension $d^{14}$ and through the pivot pin $d^3$ lock the rails independently of the latch $D^9$ in their forward position, as shown in Fig. 16. As the transporter pauses at the relay station and after the latch $D^9$ has been lifted, the active lip $e^{17}$ or $e^{18}$ is adapted to pass out of engagement with the extension $d^{14}$ and thus, by the release of the gripper fingers, permit the compression spring $D^7$ to effect the retraction of the rails, in the manner before described. The lips $e^{17}$ and $e^{18}$, while engaged with the extension $d^{14}$, also serve positively to prevent a disengagement of the gripper fingers $D^5$ from the matrix and actually supplement the wire spring $d^4$ as well as the latch.

To avoid damage to the parts that would likely result if the retraction of the receiving rails D failed to take place at the proper moment, a latch pawl $E^{14}$, controlled by the operation of the actuating lever $D^3$, is employed for positively locking the transporter against movement at the relay station until said rails are out of the way. In the preferred embodiment illustrated (Figs. 11, 13 and 28), the latch pawl $E^{14}$ is arranged behind the front rectangular member $E^4$ of the transporter and pivoted at its lower end in the depending bracket $O^3$, so that it may be rocked to and fro to carry its upper end into and out of the path of a relatively long latch plate $E^{15}$ carried by the member $E^4$. The pawl $E^{14}$ is sustained in its inactive position (Fig. 11), against the influence of a pull spring $e^{19}$, by a screw stud $e^{20}$ mounted transversely in the horizontal arm $D^8$ of the lever $D^3$ and engaging an anti-friction roller $e^{21}$ attached to the pawl. As best shown in Fig. 28, the latch plate $E^{15}$ is formed with a vertical centrally located slot $e^{22}$ and also with corresponding but oppositely inclined cam surfaces $e^{23}$, $e^{24}$ for guiding the pawl into the slot.

When the arm $D^8$ is pushed downwardly in the manner previously described by the lever $E^5$ or $E^6$, to move the rails D to their receiving position, the spring $e^{19}$ will be allowed to swing the pawl $E^{14}$ a limited distance forwardly, this operation, as will be remembered, taking place as the transporter E completes its active stroke in one direction or the other. Consequently, during the return stroke of the transporter, the cam surface $e^{23}$ or $e^{24}$ will engage the pawl and force it rearwardly in opposition to the spring $e^{19}$ and, as the transporter pauses at the relay station, the pawl is adapted to snap into the slot $e^{22}$ and lock the transporter against operation until the lever $D^3$ is released by the plate $E^{13}$ and the latch $D^9$. The receiving rails D then will be retracted and, as the arm $D^8$ of said lever rises, the pawl will be disengaged from the plate $E^{15}$ by the stud $e^{20}$ and so release the transporter.

The stop plate $g^2$ for the lever $E^7$ is made quite narrow (see Figs. 4 and 5) so that the finger-like projection $e^{15}$ of said lever may quickly break its engagement therewith, as the transporter starts its active stroke in one direction or the other, and permit the clamping member $E^{11}$ to grip the matrix and hold it down upon the shelf $E^1$ under the influence of the spring $e^{13}$, the action of the supplemental spring $g^3$ at this time being neutralized by the arrest of the lever $G^2$ against the stop screw $o^6$. Such clamping pressure upon a matrix is maintained throughout the active stroke of the transporter or until just before the latter pauses at the transfer station for the appropriate distributor. The pressure then will be removed by the engagement of the finger-like projection with one or the other of two cam blocks $g^7$, $g^8$, also secured to the distributor beam O and arranged on opposite sides of the stop plate $g^2$ in spaced relation thereto. At their lower ends, the blocks $g^7$ and $g^8$ are formed with corresponding beveled or cam surfaces $g^9$ and are adapted, by their engagement with said projection, to rock the lever $E^7$ slightly clockwise and sustain it against the influence of the spring $e^{13}$ in the position shown in Figs. 33 and 34. While the clamping member $E^{11}$ thus will be raised out of direct contact with a matrix, the side lugs $e^{11}$ thereof still will lightly embrace its upper projecting ears, in order to hold it upright upon the shelf $E^1$ preparatory to its transfer therefrom to the distributor screws.

In carrying out the invention, the transfer of a matrix X, Z or Y from the transporter to the appropriate distributor is effected by the operation of the reciprocating member C before described and in such manner that it will take place simultaneously with the advance of the next following detached matrix from the distributor box to the receiving rails D. The transfer fingers $C^4$ and $C^5$ of the member C (Figs. 4 and 45) terminate in engaging relation to the projecting ears of a matrix Y when it is shifted to the transfer station for the rear distributor $A^1$, and the transfer fingers $C^6$ and $C^7$ terminate in similar relation to the projecting ears of a matrix X or Z when it is shifted to the transfer station for the front distributor $A^2$. During the active stroke of the reciprocating member C, the inclined surfaces $c^{20}$ of the fingers $C^4$ or $C^6$ are adapted to engage the depending side lugs of the clamping member $E^{11}$ and cam the lever arm $E^8$ upwardly. By this operation, the lugs $e^{11}$ (Figs. 34 and 35) will be completely disengaged from a matrix before the fingers engage its projecting ears, and the stud $e^{14}$ on the arm $E^8$ will be carried into a position opposite the cam surface $g$ or $g^1$ of the adjacent cam plate G or $G^1$. Now, when the transporter E starts its return movement, the stud $e^{14}$ will be caused to engage the cam surface of the active plate and ride onto the upper edge thereof in the manner before stated, so that the clamping member $E^{11}$ may clear a matrix supported on the receiving rails D.

Figure 3:
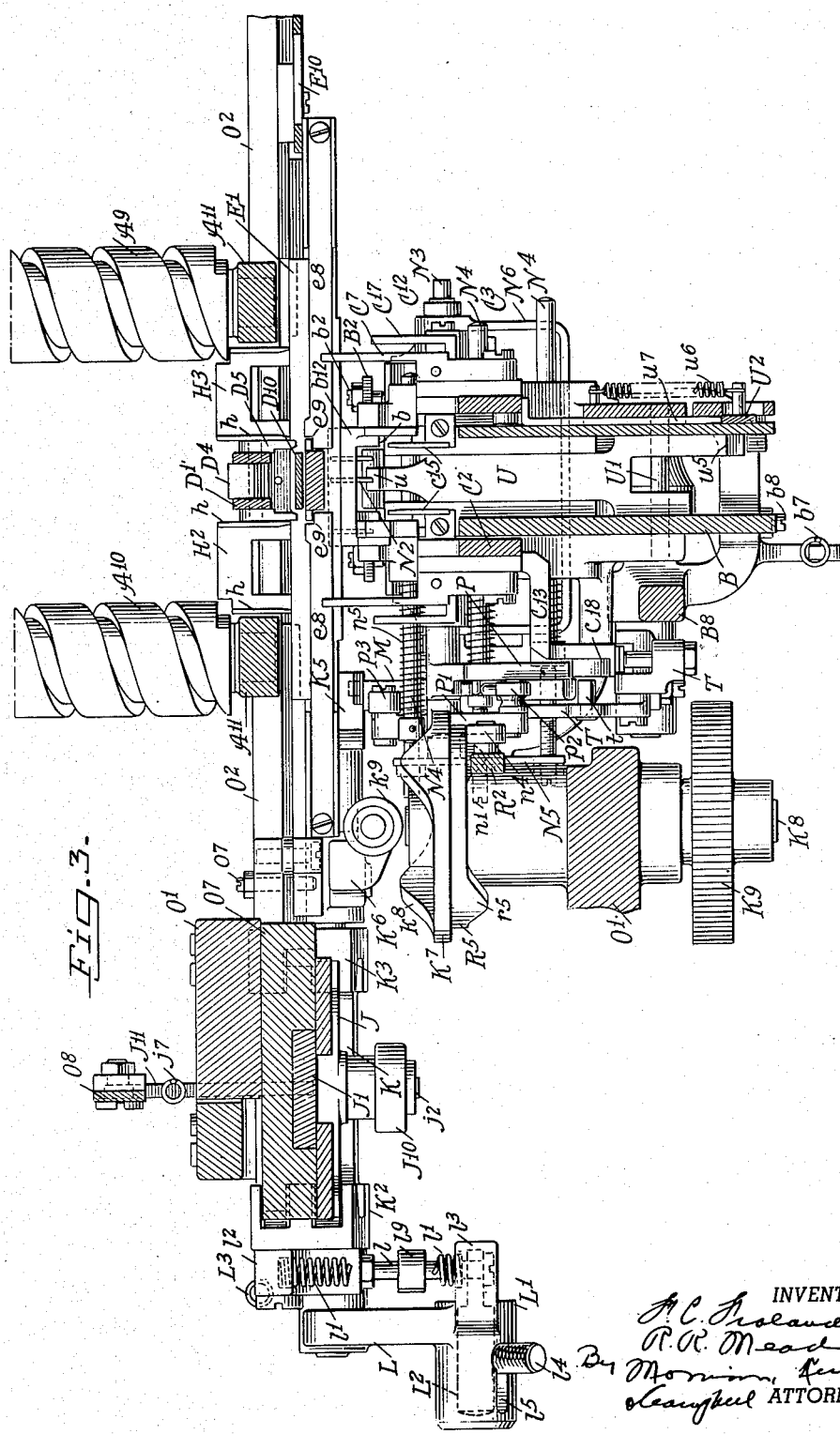
Fig. 3 is a horizontal section taken approximately on the line 3—3 of Fig. 2.

As the lugs $e^{11}$ break their engagement with a matrix Y, it will be pushed by the set of transfer fingers $C^4$, $C^5$ across the shelf $E^1$ of the transporter into engagement with a pair of fixed supporting rails H leading to the rear distributor $A^1$; and, as the lugs break their engagement with a matrix X or Z, it will be pushed by the other set of transfer fingers $C^6$, $C^7$ across the transporter shelf $E^1$ into engagement with a pair of similar rails $H^1$ leading to the front distributor $A^2$. The rails H and $H^1$ are adapted to support the matrices by their upper projecting ears, and the upper edges of the rails, as may be observed (Figs. 34 and 35), are beveled off near the front so that the matrices first will be raised slightly above the shelf $E^1$ and then be sustained in a position to properly engage the distributor bar $A^7$ of the appropriate distributor, as the matrices are advanced across the rails into the threads of the distributor screws. Matrices supported on the rails H and $H^1$ are restrained against possible edgewise displacement by guiding flanges $h$ rising from supporting plates $H^2$, $H^3$ arranged flush with the shelf $E^1$ and fastened to relatively small auxiliary brackets $H^4$ on the horizontal bracket $O^2$ (Figs. 3 and 6). The guiding flanges $h$ are arranged in engaging relation to the lower projecting ears of the matrices and are also adapted to straighten up the matrices as they are pushed into engagement with the rails H and $H^1$.

During the pause of the reciprocating member C after it completes its active stroke in transferring a matrix to the distributor $A^1$ or $A^2$, and in advancing the next following matrix to the receiving rails D, the transporter E will be en route to the relay station. Therefore, to prevent possible displacement of a matrix supported upon the rails by the leaf spring elements $e^8$ (before described), the member C has a pair of rigid depressor fingers $C^{17}$ which are adapted at this time to flatten out and hold down the spring elements upon the top surface of the transporter shelf $E^1$, so that they may pass freely beneath said matrix. The fingers $C^{17}$ (Figs. 3 and 18) project rearwardly from the fixed flanges $C^7$ and $C^8$ of the member C and are beveled off at their extremities so that they may depress the spring elements $e^8$ as said member partakes of its advancing stroke.

Figure 29:
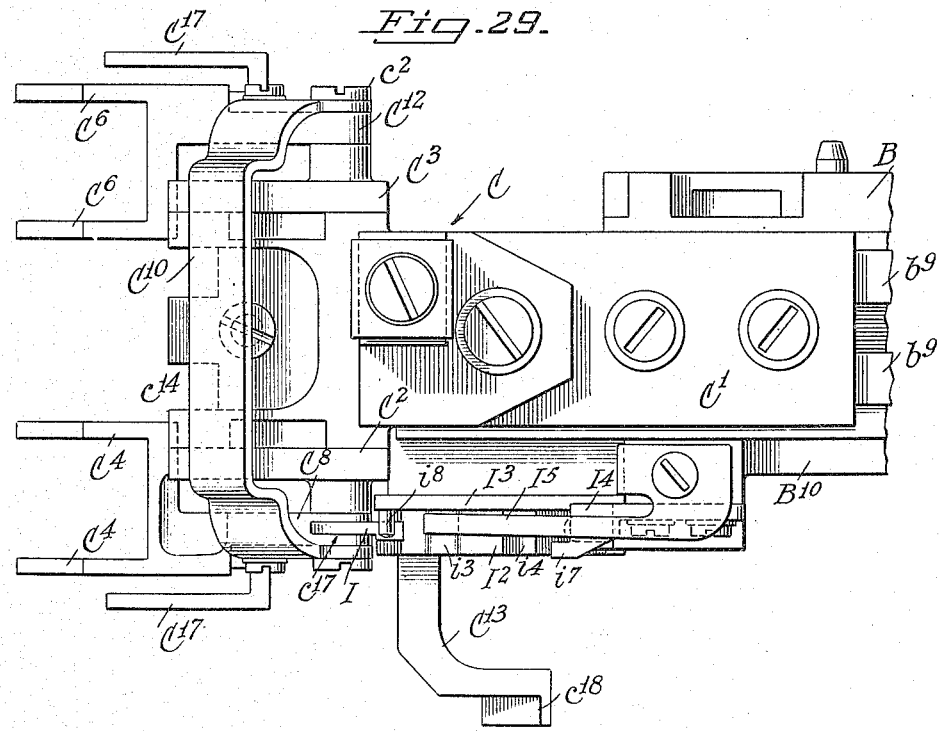
Fig. 29 is a top plan view, on an enlarged scale, of the matrix advancing member and a portion of the distributor box, showing the transfer fingers and the tilting devices therefor.

It so happens in the present construction, and due to the compact relation of the parts, that the inner ones of the transfer fingers $C^4$ and $C^6$ of the member C will be located directly in the path of matrices above a given thickness (Fig. 45) as the latter are shifted by the transporter E from the relay station into transfer relation to one distributor or the other, this operation being timed to take place as the transfer fingers start their retreat from their fully advanced position shown in Fig. 37. To take care of this condition, means effective during the return stroke of the reciprocating member C are employed for tilting both pairs of fingers $C^4$ and $C^6$ upwardly out of the way about their respective pivot screws $c^1$ and $c^2$. Such means (Figs. 29, 36 and 37) include a dog I mounted loosely on the pivot screw $c^1$ and located directly over a fixed cam plate $I^1$ secured near its front end to a stationary bracket $B^{10}$ of the distributor box. During the advance stroke of the member C, the angular position of the dog is such that it will clear or ride idly over the cam plate $I^1$, but, as the member C completes the stroke, the angular position of the dog will be reversed, so that during the return stroke of said member the dog will be caused to engage the top surface of the cam plate and sustain the fingers $C^4$ and $C^6$ in an elevated position until said member approaches the end of its return stroke. The dog I and transfer fingers will then be restored to their original positions preparatory to the next advancing stroke of the member C.

The dog I is formed with upper and lower arms $i^1$ and $i^2$, respectively; and to permit its rocking movements relatively to the cam plate $I^1$, the top surface of the latter is formed with beveled spaced-apart depressions $i^3$ and $i^4$. As best shown in Figs. 36 and 37, the cam plate $I^1$ is equipped with an elongated wire spring $I^2$ extending longitudinally therethrough and shaped at its free end with a bent-over nose $i^5$ protruding from the rear end of the plate into the path of the lower arm $i^2$ of the dog I. The other arm $i^1$ of the dog is arranged alongside an extension $I^3$ of a fixed block $I^4$ and terminates directly beneath a flat spring $I^5$ which is fastened to the stationary bracket $B^{10}$ and formed with a looped end portion $i^6$ disposed in the path of the arm $i^1$. The bracket $B^{10}$ is offset laterally to house a small spring plunger $I^6$ and the block $I^4$ is formed with an offset protuberance $i^7$ arranged in engaging relation to a beveled or cam surface $c^{16}$ formed on the contiguous arm of the connecting bail $C^{10}$ for the transfer fingers $C^4$ and $C^6$. The dog I (Fig. 29) is arranged between the side walls of a vertical slot $c^{17}$ in the hub portion of the supporting arm for the fingers $C^4$, and the rear edge of its lower arm $i^2$ is squared off so as to engage the contiguous wall of the slot when the dog is rocked from its angular position shown in Fig. 36 to that shown in full lines in Fig. 37.

The relation of the parts is such that, when the member C approaches the end of its active stroke in transferring a matrix from the shelf $E^1$ of the transporter to the distributor $A^1$ or $A^2$, the upper arm $i^1$ of the dog I is adapted to engage the looped end portion of the spring $I^5$; and, as a result, the dog will be rocked clockwise, as permitted by the depression $i^3$ in the top of the cam plate $I^1$, in order to force the lower end of the arm $i^2$ past the nose $i^5$ of the wire spring $I^2$. As the member C completes its active stroke, the arm $i^1$, after under-riding the loop $i^6$, will be caused to engage a stud $i^8$ mounted in the extension $I^3$ and thus rock the dog sufficiently far in the same direction to carry the squared-off edge of its other arm $i^2$ against the wall of the vertical slot $c^{18}$ without disturbing the transfer fingers. At this time, the lower end of the arm $i^2$ will be directly opposed to the nose portion $i^5$ of the spring $I^2$, as shown in Fig. 37, so that it may ride upwardly and over the same onto the cam plate $I^1$ as soon as the member C starts its return stroke. As a result, during the return stroke of the member C, the fingers $C^4$ as well as the fingers $C^6$ first will be tilted upwardly and then be sustained by the cam plate I$^1$ (through the dog of course) in their elevated position throughout the return stroke of the member C or until the lower end of the arm $i^2$ reaches the other depression $i^4$ in the cam plate I$^1$, at which time the dog will be restored to its original angular position by the engagement of the arm $i^1$ with the spring plunger I$^6$. While the transfer fingers C$^4$ and C$^6$ are now free to drop to their normal or matrix engaging position, they will be forced downwardly, for reasons of safety, by the engagement of the cam surface $c^{16}$ with the protuberance $i^7$. In this connection, it may also be mentioned, for the sake of clearness, that while the lower transfer fingers C$^5$ and C$^7$ stand removed from the path of a matrix as it is shifted by the transporter to a transfer station, they nevertheless must undergo a slight pivotal movement due to the presence of the leaf spring elements $d^8$ on the shelf E$^1$ of the transporter.

*Transporter operating and control devices*

The reciprocatory movements of the transporter E (Figs. 4, 5, 8, 9 and 10) are effected by a T-shaped rocking lever J carried by a vertical reciprocating slide J$^1$ and having its shank portion J$^2$ operatively connected through an extension J$^3$ and a block J$^4$ to one end of the transporter. The block J$^4$ is slidably mounted in suitable guideways $e^{22}$ of the transporter and pivotally attached to the lower end of the extension J$^3$, the latter, for obvious reasons, being capable of adjustment as to length by means of a set screw $j$ and located in its proper angular position relatively to the shank portion of the lever J by a pair of clamping studs $j^1$. The lever J is fulcrummed midway between its lateral arms J$^5$, J$^6$ on a bearing stud $j^2$, and its movements are controlled by an adjustable U-shaped element K hingedly mounted on a rock shaft K$^1$ and formed with two upright side members K$^2$ and K$^3$ disposed, respectively, in operative relation to the arms J$^5$ and J$^6$. The extension J$^3$ is fastened to the shank of the lever J by a bolt $j^3$; and to properly guide and sustain the lever during its operation, the bolt is extended rearwardly to engage a slot $j^4$ formed concentrically with the bearing stud $j^2$ in the lower end of the slide J$^1$. The side member K$^2$ of the control element K (Figs. 40 to 43 inclusive) is widened and thickened at the top to provide two clearance grooves $k$, $k^1$ and an intermediate banking surface $k^2$ for the lateral arm J$^5$ of the lever J; whereas the other side member K$^3$ of said element is widened and thickened at the top to provide two banking surfaces $k^3$, $k^4$ and an intermediate clearance groove $k^5$ for the lateral arm J$^6$ of the lever J.

When the control element K occupies the adjusted position shown in Figs. 3 and 40, the clearance groove $k^1$ of the upright side member K$^2$ and the opposed banking surface $k^4$ of the corresponding side member K$^3$ will be disposed, respectively, beneath the rounded extremities of the lateral arms J$^5$ and J$^6$ of the lever J, so that, during the downward movement of the slide J$^1$, the lever will be swung counter-clockwise from its neutral or vertical position shown in Fig. 4 to the position shown in Fig. 8, whereby the transporter E will be shifted in one direction to carry a matrix X or Z from the relay station into transfer relation to the front distributor A$^2$. During the upward movement of the slide J$^1$, the lever J will be swung back to its original position to return the transporter to the relay station.

On the other hand, when the control element K occupies the adjusted position shown in Figs. 41 and 42, with the banking surface $k^2$ and opposed groove $k^5$ disposed respectively beneath the lateral arms J$^5$ and J$^6$ of the lever J, the latter will be swung clockwise by the downward movement of the slide J$^1$ and shift the transporter in the opposite direction to carry a matrix Y from the relay station into transfer relation to the rear distributor A$^1$. As the slide J$^1$ moves upwardly, the lever J again will be restored to its neutral position and return the transporter to the relay station.

The slide J$^1$ (Figs. 2 and 3) is mounted and guided in a fixed member O$^7$ of the bracket O$^1$ and is operable by a pair of edge cams J$^7$ and J$^8$, which are keyed to the hub portion of the grooved cam C$^{15}$ (before mentioned) and disposed between two anti-friction rollers J$^9$, J$^{10}$ carried by the slide. The roller J$^9$ is located near the upper end of the slide and mounted on a stud $j^5$, while the roller J$^{10}$ is located near the lower end of the slide and mounted on the bearing stud $j^2$ for the T-shaped lever J. During each cycle of operation, the cams J$^7$ and J$^8$ are adapted to impart a complete reciprocation to the slide J$^1$, the cam J$^7$ acting through its engagement with the upper roller J$^9$ to raise the slide, and the cam J$^8$ acting through its engagement with the lower roller J$^{10}$ to push the slide downwardly. This latter operation takes place in opposition to a pull spring $j^7$ (Fig. 2), arranged behind the supporting bracket O$^7$ for the slide J$^1$ and adapted to preclude the possibility of binding between the cams and rollers and promote smoothness in the operation of the slide. The spring $j^7$ is anchored to the upper end of the an angular bracket plate O$^8$, depending from the main bracket O$^2$, and is attached to a lift arm J$^{11}$ pivoted to the lower end of said plate and engaging the bottom edge of the slide J$^1$.

The adjustments of the control element K are effected automatically during each cycle by a partial rotation in opposite directions of the rock shaft K$^1$, the latter (Figs. 3, 8, 9 and 10) being equipped at its left-hand end with an upwardly and forwardly curved arm L operatively connected with the control element K, such connection comprising an elongated screw $l$ and an expansion spring $l^1$ arranged between an angular block $l^2$ carried by the control element and an ear $l^3$ rising from an offset housing L$^1$ formed at the upper extremity of the arm L. The screw $l$ extends forwardly from the block $l^2$ and is connected with a retractible plunger L$^2$ mounted in the housing L$^1$ and disposed at right angles to the screw $l$. As best shown in Figs. 3 and 8, one end of the plunger L$^2$ is flattened on opposite sides and also forked to engage the shank of the screw $l$ immediately behind the head portion thereof so as to hold the control element K, against the energy of the expansion spring $l^1$, in a definite angular position relatively to the arm L. To prevent longitudinal displacement of the plunger L$^2$, it is equipped with a locking pin $l^4$ (Fig. 2) mounted transversely therein for a limited endwise movement and projecting upwardly through a slot $l^5$ formed in the housing L$^1$. A portion of the locking pin $l^4$ between its ends is turned down or reduced in size to fit the slot $l^5$, and the latter is enlarged at one end to provide a rounded aperture to fit the full size of the pin. When the pin is engaged with the aperture (Fig. 8) the plunger will be locked in place, but, by pulling the pin upwardly, the reduced portion thereof may be brought into registry with slot $l^5$ and permit the plunger, for reasons presently to appear, to be moved into or out of engagement with the shank of the screw $l$.

The rock shaft $K^1$ (Figs. 4 and 5) is journaled in suitable bearings $K^4$ secured to the bracket $O^2$, and at its right-hand end, it has fast thereto an upright arm $K^5$ arranged to engage a trip pawl M which normally sustains the control element K, through the connections just described and against the tension of a pull spring $L^3$, in the position shown in Fig. 40 or 42, the spring $L^3$ (Fig. 2) being anchored to the bracket $O^2$ and attached to a pin $l^6$ projecting rearwardly from the hub of the arm L. The trip pawl M (Fig. 26) is pivotally mounted in a frame structure $B^5$, underlying the distributor box, and is formed at its free end with a shouldered recess $m$ adapted to fit against a lateral, overlying lug or protuberance $k^6$ formed at the upper extremity of the arm $K^5$. A light pull spring $m^1$, attached to the other end of the pawl, holds the latter in its normal position (Figs. 9 and 10) with the bottom wall of the recess $m$ banking against the lower edge of the lug $k^6$ and with the vertical wall thereof engaging the front edge of the lug. When the pawl is actuated to break its engagement with the arm $K^5$, as indicated by the dotted lines in Fig. 9, the pull spring $L^3$ will be allowed to rock the curved arm L forwardly and, through the connecting screw $l$, swing the control element K in the same direction from the adjusted position shown in Fig. 40 to that shown in Fig. 41. To limit the movement of the arm L at such times and thus locate the control element in its newly adjusted position, a banking screw $o^7$ is employed to stop the rotation of the rock shaft $K^1$. The screw $o^7$ (Figs. 8 and 9) is mounted in the bracket $O^2$ and directly opposed to a lug $k^7$ depending from the hub of a crank arm $K^6$ also fast to the rock shaft.

The return movement of the arm L to restore the control element to its original position is effected by a constantly rotating face cam $K^7$ (Figs. 3, 8 and 38) having two lobes $k^8$ arranged to engage an anti-friction roller $k^9$ carried by the crank arm $K^6$, just referred to. The cam $K^7$ is fastened to the rear end of a shaft $K^8$ journaled in the main bracket $O^1$ and is driven from the pinion $A^{13}$, through a gear wheel $K^9$, at half the speed of rotation of the distributor screws. Consequently, one or the other of the cam lobes $k^8$, through its engagement with the roller $k^9$, may operate the crank arm to reverse the movement of the rock shaft $K^1$ during each successive cycle and permit the trip pawl M to swing back to its active or sustaining position. While this operation is positive, the restoration of the control element K to its original position is impositive, due to the aforementioned compression spring $l^1$, and can not take place until the T-shaped lever J for operating the transporter reaches its neutral position shown in Fig. 4.

It may be found desirable to reverse the destination of the matrices Y and the matrices X or Z so that the former may be transported from the relay station into transfer relation to the front distributor $A^2$, and the matrices X or Z from said station into transfer relation to the rear distributor $A^1$. To this end, the control element K is capable of a manual adjustment relatively to the arm L, so that the banking surface $k^2$ thereof (Fig. 42), normally will be located beneath the lateral arm $J^5$ of the T-shaped lever J and the opposed clearance groove $k^5$ located beneath the other arm $J^6$ of said lever. In providing for such adjustment, the shank of the screw $l$ has a loose spacing collar $l^9$ of definite width, which may be moved to a position (Fig. 10) between the head of the screw and the flattened end of the plunger $L^2$ when desired (and as permitted by the manipulation of the plunger in the manner already described). Under this setting of the control element and while it is sustained by the trip pawl M in the position shown in Fig. 42, the transporter E will be caused to operate in the zone between the relay station and the transfer station for the rear distributor $A^1$; but when the pawl is actuated, the control element will be swung forwardly by its spring $L^3$ to the third adjusted position shown in Fig. 43 and cause the transporter to operate in the other zone between the relay station and the transfer station for the front distributor $A^2$.

*Devices controlling the destination of the matrices*

The improved distributing mechanism is intended to handle matrices of all forms now in commercial use. Some of these matrices are formed in their lower edges with three notches, others with two notches, others with one notch, and still others with no notch. As before noted, the matrices herein illustrated (selected purely by way of example) are of the second and third forms mentioned; that is to say, the matrices X or Z are formed in their lower edges with two notches and the matrices Y with one notch.

The form of the matrices determines their destination, this control being exercised through form distinguishing elements N, of which there are three, and of which one or more may be employed according to the form of matrices in use. Thus, in the present instance, and since the matrices X or Z are formed with two notches, only two of the distinguishing elements are employed, the third (not needed) being rendered inactive.

The form distinguishing elements N comprise horizontally disposed body portions $N^1$ and upstanding fingers $N^2$ adapted to be arranged in the path of the matrices as the latter are lifted clear of the arresting shoulders $b$ of the distributor box rails $B^3$ and $B^4$. Said elements (Figs. 19 to 26) are provided with lateral hub members $n$ and are mounted on a supporting rod N so as to be capable of individual bodily adjustment therealong to locate the upper ends of the fingers $N^2$ in different positions.

In the preferred embodiment illustrated (Figs. 3, 19 and 20), the means for adjusting the form distinguishing elements N include a corresponding plurality of spring-actuated push rods $N^4$; and a relatively fixed gauge plate $N^5$ equipped with pre-set banking screws $n^1$ of different lengths, is arranged to engage the rods.

As best shown in Figs. 19 to 23, the push rods $N^4$ are slidably mounted for endwise movement in the frame structure $B^5$ of the distributor box, and each rod is formed with a depending slotted projection $n^2$ which loosely embraces a corresponding ear $n^3$ rising from the individual distinguishing elements. This connection permits a limited rocking movement of the distinguishing elements in relation to the rods $N^4$ and at the same time allows them to be adjusted by the rods along the supporting rod $N^3$, the extent of the adjustment allowed being such that one or more of the distinguishing elements N may be used to the exclusion of the others. At their outer extremities, the rods $N^4$ are provided with abutment caps $n^4$ and, behind the caps, they are also provided with light compression springs $n^5$ which react against the frame $B^5$ and hold the caps resiliently engaged with the banking screws $n^1$.

The gauge plate $N^5$ (Fig. 20) is fastened to a lateral extension $B^9$ of the frame structure $B^5$ and is easily accessible when desired for quick removal and interchange with similarly constructed plates having their banking screws set in different endwise positions.

As shown in Figs. 19 and 20, and for reasons above mentioned, one of the three distinguishing elements N is located, through the connections just described, in a neutral position completely out of the path of the matrices, whereas the other two elements are located in different adjusted positions corresponding to the location of the form distinguishing notches in the lower ends of the matrices X and Z. Consequently, as these matrices are detached from line, they will clear the fingers $N^2$ of the two active elements and eventually will be delivered to the front distributor $A^2$ in the manner already described. However, the matrices Y, whose form distinguishing notches do not register with the fingers $N^2$, are adapted as they are detached from line to rock the distinguishing elements about the supporting rod $N^3$ from their normal position shown in Fig. 13 to the position shown in Fig. 24.

Such rocking movement of the elements N is imparted to a conditioning agent P through the medium of a rocking bail $N^6$ and an actuating member $N^7$, both of which, as best shown in Fig. 20, are mounted on the supporting rod $N^3$ and connected to the distinguishing elements so as to move as a unit therewith. That is to say, the cross bar of the rocking bail $N^6$ is slotted longitudinally to receive the reduced end portions $n^6$ of the elements N, and one of the side arms of the bail is provided with a stud $n^7$ which projects laterally therefrom between a pair of opposing set screws $n^8$ mounted in a forked extension of the actuating member $N^7$. The fingers $N^2$ of the distinguishing elements rise from one side of the rod $N^3$ while both the bail and actuating member, as may be observed (Fig. 13), are disposed on the opposite side thereof and in effect constitute an over-balancing weight which holds the elements yieldingly engaged with the lower edge of the fixed cross bar $b^3$ (previously referred to) and thus locates the upper ends of the fingers in their proper detecting position.

The conditioning agent P is mounted to swing about a separate supporting rod $p$ and is formed with an offset portion $p^1$ adapted to seat against the upper extremity of a curved finger $N^8$ rising from the actuating member $N^7$ and serving to sustain the agent against gravity in its neutral or inactive position shown in Fig. 11. As a matrix Y is detached from line and advanced by the pusher $B^1$ the short distance determined by its own thickness along the short rail sections $b^1$, sufficient movement will be imparted thereby to the conditioning agent, through the distinguishing elements N and the actuating member $N^7$, to tilt it upwardly into the path of a beveled cam block $c^{18}$ carried by the reciprocating matrix advancing member C. Consequently, during the active stroke of member C in advancing the matrix Y to the relay station, the conditioning agent will be swung further in the same direction by the cam block $c^{18}$ and thereby caused to actuate a vertically disposed lever $P^1$ mounted alongside the agent P and on the same supporting rod $p$. The lever $P^1$ (Fig. 26) is provided at its upper and lower extremities with anti-friction rollers $p^2$ and $p^3$, respectively, the roller $p^2$ being disposed in the path of an offset housing portion $p^4$ of the conditioning agent, and the roller $p^3$ being held against the top surface of the trip pawl M by a light pull string $p^5$ anchored to the pawl and connected to lower end of the lever $p^1$.

As the reciprocating member C completes its active stroke, the lever $P^1$ will be actuated by the conditioning agent P, through its engagement with the roller $p^2$, to disengage the trip pawl M from the arm $K^5$ of the rock shaft $K^1$, whereby the control element K will be swung forwardly to its adjusted position shown in Fig. 41 and cause the delivery of the matrix Y to the rear distributor $A^1$. Meanwhile, or as soon as the matrix Y has been advanced sufficiently far to clear the fingers of the distinguishing elements N, the latter, due to the overbalancing weight of the rocking bail $N^6$ and parts carried thereby, will be restored to their original position (Fig. 13) with their body portions $N^1$ banking against the lower edge of the cross bar $b^3$ of the distributor box.

To prevent vertical displacement of the matrices X, Y or Z by the fingers $N^2$ of the distinguishing elements, as they are detached from line, and also to guide them as they are pushed across the underlying bridge bar $b^{12}$ into engagement with the receiving rails D, the distributor box B is equipped with an overhead retaining plate Q (Fig. 14), mounted on a hinge pin $q$ and extending rearwardly therefrom directly over the short rail sections $b^1$. On its lower side, the guide plate Q is cut away so as to provide a pair of opposed grooves $q^1$ (Fig. 25) arranged to fit over the upper projecting ears of detached matrices supported on the rail sections, and a looped wire spring $q^2$ located above the guide plate holds it yieldingly in its matrix engaging position upon a fixed angular bracket member $q^3$ of the box frame. The upper walls of the groove $q^1$, as may be observed (Fig. 24), are inclined downwardly from front to rear so as to exert, through the upward yielding of the retaining plate, a clamping pressure upon the matrices in crossing the bridge $b^{12}$. However, to avoid unnecessary wear on the ears of the matrices, they are relieved of this pressure just before they engage the upwardly inclined surfaces of the receiving rails D by the engagement of the upper pair of pusher blocks $c$ of the reciprocating member C, with the lower edges of the guide plate (compare Figs. 24 and 26). At the same time, the matrices are adapted to clear the rear end of plate Q so that they will be free to obtain their slightly raised position against the vertical shoulders $d^1$ of the rails D as the member C completes its active stroke.

Under perfect operating conditions, the conditioning agent P will be restored by gravity to its neutral position (Fig. 11) as the cam block $c^{18}$ passes out of engagement therewith during the return stroke of the reciprocating member C. Occasionally, however, it has been found that, due to the accumulation of dust or other foreign matter in the font notches of the matrices or on the bearing surfaces of the conditioning agent, the latter may be improperly projected into the path of the cam block $c^{18}$ or fail to reach its neutral position. In either event, a matrix X (which, as just stated, is intended to clear the fingers of the distinguishing elements as it is detached from line) will be directed to the wrong (rear) distributor $A^1$ and magazine $A^3$.

To avoid this happening, means acting just before the reciprocating member C starts its active stroke are employed for restoring the conditioning agent in a more positive manner to its neutral position. Such means (Figs. 5 and 32) include a split lever R comprising two arms $R^1$, $R^2$ depending from a fulcrum rod $R^3$ and connected together by a pin $R^4$ which is anchored at one end to the arm $R^1$ and extends through and beyond a lug $r$ projecting laterally from the arm $R^2$. Near its other end, the pin $R^4$ is provided with a pair of lock nuts $r^1$ and, between the nuts and the lug $r$, it is also provided with a compression spring $r^2$ adapted to hold the lug yieldingly against a shoulder $r^3$ of the pin and thus maintain the two arms of the lever R in proper position relatively to each other. The longer arm $R^1$ of the lever R carries at its lower extremity a roller $r^4$ arranged to engage the protruding end of a small spring plunger $p^6$ mounted in the housing portion $p^4$ of the conditioning agent P.

Operation of the lever R is effected by a rotary face cam $R^5$ having two lobes $r^5$ disposed diametrically opposite each other and arranged to engage an anti-friction roller $r^6$ carried by the shorter arm $R^2$ of the lever R. The cam $R^5$ (Fig. 38) is arranged directly in front of the cam $K^7$, hereinbefore referred to, and is keyed to the shaft $K^8$ which, as will be remembered, is driven at half the speed of rotation of the distributor screws by the gear wheel $K^9$. Consequently, the lever R will be actuated by one or the other of the cam lobes $r^5$ at the proper moment during each successive cycle to push the conditioning agent P to its neutral position and, through the actuating member $N^7$, restore the distinguishing elements N to their position of rest against the cross bar $b^3$. When the conditioning agent has been raised in the normal way by a detached matrix Y, the plunger $p^6$ will merely yield under the influence of the lever R, and the pressure thus imparted to the matrix by the fingers $N^2$ of the distinguishing elements N will be negligible and in no way objectionable. However, if positive resistance (due, for example, to a jammed matrix) should prevent the proper functioning of the lever R, the shorter arm $R^2$ thereof is adapted to yield relatively to the arm $R^1$ against the tension of the spring $r^2$ and in this way avoid damage to the parts.

Provision is also made for automatically stopping the operation of the distributing mechanism under the conditions last stated, in order that the obstructing matrix may be removed. To that end, the shorter arm $R^2$ of the lever R (Fig. 5) is formed with a hub portion $r^7$ pinned to the fulcrum rod $R^3$; whereas the longer arm $R^1$ is pivotally mounted on the rod and provided at the hub with a cam plate $R^6$ which is directly opposed to a stud $r^8$ mounted transversely in the arm $R^2$. The rod $R^3$ is mounted for endwise as well as rotary movement in right and left hand bearings $o^8$, $o^9$ of a fixed angular bracket $O^9$, and is equipped with a bail-shaped brake shoe $R^7$ (Fig. 5) arranged adjacent the bearing $o^9$ in engaging relation to the outer concentric surface of the grooved cam $C^{15}$ before mentioned. A compression spring $r^9$, seated against a shoulder of the rod $R^3$ and reacting against the inner face of the right-hand bearing $o^8$, holds the hub portions of the arms $R^1$, $R^2$ together and thus locates the stud $r^8$ and brake shoe $R^7$ in their proper positions. The brake shoe is locked against angular displacement relatively to the cam $C^{15}$ by a pin $r^{10}$ projecting from the bracket $O^9$ through a corresponding aperture in the shoe.

The cam $C^{15}$ (Figs. 1 and 38) is keyed to a shaft S, journaled in the main bracket $O^1$ and provided with a gear $S^1$ driven also from the pinion $A^{13}$ through the gear wheel $K^9$ and through a pair of idler gears $S^2$, $S^3$. The hub portion of the idler $S^2$ is arranged adjacent the hub portion of the gear $S^1$, and each is equipped with one of a pair of spiral wedge stop elements $S^4$ of the kind commonly used in commercial Linotype machines (see, for instance, the Paine Patent No. 1,099,465).

Through the connections described, it should now be clear that, in the event of interference with the normal operation of the lever R, the arm $R^2$ thereof in yielding against the pressure of the spring $r^2$ will also be cammed axially away from its companion $R^1$ by the engagement of the stud $r^8$ with the cam plate $R^6$. Thus, the brake shoe $R^7$, through the connecting rod $R^3$, will be forced into frictional engagement with the cam $C^{15}$ to retard the speed of rotation of the shaft S and thereby cause the spiral wedge elements $S^4$ to function in stopping the operation of the distributing mechanism. When the obstruction is removed, the parts will be automatically restored to their original positions by the springs $r^2$ and $r^9$.

It has also been found desirable, for reasons of safety, positively to hold the conditioning agent P in its normal position (Fig. 11) out of the path of the cam block $c^{18}$ during the operation of the matrix advancing member C. For this purpose, the distributor box mechanism includes an irregularly shaped bell crank lever T, mounted on the pivot shaft $b^5$ for the lift lever $B^7$ and arranged adjacent the extension $B^9$ of the frame structure $B^5$. The lever T is equipped with a horizontally disposed link $T^1$ and is movable a limited distance about the shaft $b^5$ to carry a lateral stud $t$ riveted to the link, into and out of engagement with a beveled or cam surface $p^7$ (Fig. 12) formed on the housing portion $p^4$ of the conditioning agent. The link $T^1$ is pivotally connected at one end to the vertical arm $T^2$ of the lever T and is forked at its opposite end to slidably engage a screw stud $n^{12}$ carried by the actuating member $N^7$ for the conditioning agent.

Operation of the lever T is controlled by the reciprocating member C through a flat spring plate $t^1$ secured to the arm $T^2$ and projecting above the same into operative relation to the cam block $c^{18}$. As the member C completes its return stroke, the lever T will be rocked clockwise (Fig. 11) by the block $c^{18}$ to disengage the stud $t$ from the conditioning agent P; and when said member starts its active stroke, the lever T will be moved in the opposite direction by means of a spring plunger $t^2$ mounted in the other arm $T^3$ of the lever and reacting against the under surface of the frame extension $B^9$. The movement of the lever in this direction will be limited by the engagement of the stud $t$ with the cam surface $p^7$, whenever the conditioning agent P occupies its normal position; but, if the conditioning agent has been raised by a detached matrix, such movement of the lever then will be limited by a stop pin $t^3$, mounted in the arm $T^2$ and engaging one side of the frame extension. Under these conditions, it may be mentioned that the link $T^1$, through its connection with the actuating member $N^7$, is adapted to rock the fingers of the distinguishing elements N downwardly out of the path of extremely thin detached matrices Y before the pusher blocks c of the reciprocating member engages them. Consequently, such matrices will be relieved of unnecessary wear to which they might otherwise be subjected in camming the fingers $N^2$ out of their way as they are advanced to the relay station.

Auxiliary stop member

In order to insure the proper functioning of the form distinguishing elements N for all matrices, particularly when the back-milled matrices Z are being used together with the matrices X or Y, the distributor box B is provided with an auxiliary stop member U (Figs. 24, 26 and 27), pivotally mounted on a fixed cross rod $U^1$ and arranged longitudinally of the box directly beneath a line of matrices supported on the box rails $B^3$ and $B^4$. The stop member U is formed at its rear end with an upturned shoulder or lip $u$ and is capable of a limited movement about the pivot rod to carry the lip upwardly and downwardly into and out of the path of the matrices Z as they are advanced through the box. The movements of the stop member U are controlled by the operation of the bell crank lever $B^7$ which carries the matrix lifting finger $B^2$, said lever for this purpose being provided with a screw pin $u^1$ adjustably mounted therein and arranged to engage an angular projection $u^2$ depending from the stop member.

The lifting finger $B^2$ (Fig. 27) is bifurcated at the top to clear the lip $u$, and when it is raised by the lever $B^7$ to detach a matrix from line, the pin $u^1$ is adapted, through its engagement with the projection $u^2$, to rock the stop member U upwardly and locate the lip in its matrix arresting position shown in Fig. 24. Such movement of the stop member is effected in opposition to a pull spring $u^3$ attached thereto and anchored to a fixed stud $u^4$. At its forward end, the stop member U is formed with an open notch or recess $u^5$, and, for reasons about to appear, it is sustained momentarily in its active position by a latch pawl $U^2$, fulcrumed to one of the side walls of the distributor box and offset at its lower end to engage the notch $u^5$. The latch pawl $U^2$ (Figs. 1 and 3) is attached to a pull spring $u^6$ and is responsive to the operation of the reciprocating matrix advancing member C through a horizontally disposed slide $u^7$, mounted in the frame structure of the distributor box and disposed in the path of the depending side plate $C^3$ of the member C.

The arrangement of the parts is such that, as the reciprocating member C completes its return stroke, the latch $U^2$ will be swung by the slide $u^7$ out of engagement with the stop member U and permit the latter to be pulled downwardly by the spring $u^3$ to the position shown in Fig. 14 so as to locate the lip $u$ slightly below the leading matrix of the line, the pin $u^1$ in the lever $B^7$ at such moment having broken its engagement with the depending projection $u^2$, and the matrix lifting finger $B^2$ being located in its lowermost position. During the upward movement of the lifting finger and just before the leading matrix clears the stop shoulders $b$ of the box rails, the lip of the member U will have been moved into a position to arrest the next following matrix (if it happens to be one of the back-milled variety Z) with its projecting ears disposed in advance of the stop shoulders. Consequently, as the leading matrix clears the shoulders $b$, it still will be advanced a distance equal only to that of its own thickness and regardless of the setwise position of the projecting ears of the matrix Z. At the start of the active stroke of the reciprocating member C and before the pusher blocks c have engaged the projecting ears of the leading matrix, the latch $U^2$ will be moved by its spring $u^6$ into locking engagement with the stop member U and thus hold it in its matrix arresting position until the lifting finger is again restored to its lowermost position and the member C completes its return stroke. At this latter time (see Figs. 31 and 32) and as the lip $u$ of the stop member breaks its engagement with the back-milled matrix Z, the latter (now the leading matrix) will be pushed up against the stop shoulders of the box rails by the line shifter $B^1$ before mentioned. Such movement of the matrix Z will actuate the distinguishing elements N, as shown in Fig. 31, and thus raise the conditioning agent P to its active position regardless of the location of the font notches. However, prior to the advance of said matrix by the member C after it is detached from line, the agent P and elements N will be restored to their original positions, either by gravity or by the lever R in the manner before described, provided the font notches in the lower edge of the matrix register with the fingers of the elements N. Otherwise, the position of the conditioning agent will remain unchanged to function in the manner required. In this connection, it may be stated, by way of explanation, that the auxiliary stop member U is intended primarily to prevent the delivery of a detached matrix X to the wrong magazine, as would result if the conditioning agent P were raised by a next following back-milled matrix Z at the time the preceding matrix X cleared the shoulders $b$ of the box rails.

Stray matrices

As previously stated, matrices whose font notches do not register with the fingers of the form distinguishing elements N will be directed to the rear distributor $A^1$ for the lower magazine $A^3$, but occasionally such matrices may include "strays" which will also find their way to the lower magazine. To avoid that occurrence, the bridge plate $H^2$, over which the matrices Y are transferred to the distributor $A^1$, is equipped with a detector block V arranged in an open recess $h^1$ formed in the front face of the bridge plate. As best shown in Figs. 6, 34 and 35, the block V fits snugly within the recess and is formed with a low rib $v$ extending transversely across its upper edge and located so as to engage the form distinguishing notch $y^2$ in the lower edge of a matrix Y. A single filister screw $v^1$ is employed to hold the block in place so that it may be quickly removed when desired and replaced by other blocks corresponding with matrices of different forms. Matrices whose form distinguishing notches do not register with the rib $v$ positively will be intercepted thereby and, through the driving connections for the reciprocating member C, retard the rotation of the grooved cam $C^{15}$ and thus stop the operation of the distributing mechanism.

The other bridge plate $H^3$, as may be observed (Fig. 6), is also formed with a recess $h^2$ similar to the recess $h^1$ and adapted to accommodate the detector block V in order that the latter may serve for the front distributor $A^2$ when, under a reverse setting of the control element K (as before described) the matrices Y are directed to that distributor rather than to the rear distributor.

Recapitulation

It is believed that the operation of the parts will have been clear from the detailed description already given, but a brief recapitulation may be helpful.

As each matrix is detached from the line by the lifting finger B¹, it is pushed ahead facewise by the advancing member C until it reaches the relay station, where it is temporarily supported by the receiving rails D, the transporter E at that time not being ready to receive it. If the matrix is one destined for the front distributor (a matrix X or Z), it will in its advance clear the form distinguishing elements N and fail to actuate them, thus allowing the conditioning agent P to remain in its normal horizontal position and out of engaging relation to the cam block $c^{18}$ on the advancing member C. Under this condition, the control element K will remain in its normal adjusted position and function to cause the transporter E to reciprocate back and forth in the zone between the relay station and the transfer station for the front distributor. If, on the other hand, the matrix is one destined for the rear distributor (a matrix Y), it will in its advance actuate the form distinguishing elements N and locate the conditioning agent P in the path of the cam block $c^{18}$. Under this second condition, the control element K will be rocked to its other adjusted position, as the advancing member C nears the end of its advancing stroke, and function to cause the transporter E to reciprocate back and forth in the zone between the relay station and the transfer station for the rear distributor. As the transporter E arrives at the relay station, the receiving rails D are retracted and the matrix deposited upon the shelf E¹ of the transporter, being held in upright position thereon by the overhead clamping member E¹¹. In this connection it may be noted that the interval of time between the arrival of the matrix at the relay station and its pickup by the transporter is so brief as to be almost instantaneous. After picking up the released matrix, the transporter carries it edgewise, either forwardly or rearwardly from the relay station, according as the transporter is conditioned to operate in one zone or the other, and positions it in transfer relation to the appropriate distributor. During this active stroke of the transporter, the matrix advancing member C is restored to its original position in readiness to advance the next following matrix. When the transporter arrives at the transfer station, it pauses momentarily to allow the matrix to be pushed ahead facewise from the transporter into the threads of the distributor screws, whence it is carried onto the distributor bar in the usual way and dropped into the proper magazine channel. Such transfer of the matrix from the transporter to the distributor is effected by the advancing member C which, in addition to forwarding a following matrix to the relay station, will (by means of the transfer fingers C⁴ or C⁶, whichever set is active) engage the preceding matrix and forward it to the distributor in the manner just stated. Of course, before the leading matrix can be transferred to the distributor, the clamping device E¹¹ must be disengaged therefrom and this disengaging action is effected by the advancing member C through the fingers C⁴ or C⁶ before they make contact with the matrix. Again, it may be noted that the interval of time between the arrival of the transporter at the transfer station and the advance of the matrix from that station to the distributor is so brief as to be almost instantaneous. It will have been understood that, as a leading matrix is transferred to its appropriate distributor from the transporter, the next following matrix arrives at the relay station, to be delivered in similar fashion to its appropriate distributor, said matrix having in its advance to the relay station determined its own destination through the actuation or non-actuation of the form distinguishing elements. Thus the delivery of the matrices to the appropriate distributors is continuous or uninterrupted, one matrix (except for the first in the line) being delivered to a distributor at each cycle of operation of the mechanism. In other words, while two cycles of operation are required to deliver the first matrix of the line from the distributor box to its appropriate distributor, nevertheless all the remaining matrices of the line will be delivered to the appropriate distributors at each successive cycle of operation, whereby the rate of feed of the matrices as determined by the matrix lifting finger is maintained.

The path of an individual matrix is clearly depicted in the diagram of Fig. 44. Referring first to the full line arrows, the matrix is pushed facewise through the distributor box up against the stops on the box rails, then lifted .246" to clear the box rails, then advanced its first step to the relay station above the transporter shelf, being first raised and then depressed .046" upon the transporter shelf preparatory to being shifted edgewise in a rearward direction .784" into line with the rear distributor, and finally advanced its second step to the distributor screws of the rear distributor as the next matrix is advanced its first step to the relay station. The dotted line arrows merely indicate the path of the matrix from the relay station to the front distributor should the matrix be destined for that distributor.

The diagram of Fig. 45 depicts the path of an individual matrix likewise: Thus, the matrix (here shown as of the greatest thickness) is advanced facewise from position 1 in the distributor box to position 2 at the relay station and then carried edgewise, either rearwardly to position 2ª or forwardly to position 2ᵇ to the transfer station, from which it is advanced facewise to the appropriate distributor bar, front or rear as the case may be. The purpose in illustrating a matrix of the greatest thickness, in this diagram, is to bring out that the transfer fingers C⁴ or C⁶ must be raised out of the way of the matrix as it is shifted from the relay station to the appropriate transfer station. The dimensions noted on the drawing show that the matrix is of .556" in comparison with a total movement of .958" of the matrix advancing member or the matrix pusher elements carried thereby.

Having thus described our invention, what we claim is:

1. Typographical distributing mechanism including, in combination, two distributors for handling matrices of different form, a distributor box to which the matrices are transferred in line, means for detaching the matrices one after another from the line, means for advancing and supporting detached matrices of both forms at a common level, and mechanism cooperating with the detached matrices in their advance for delivering them according to form to one distributor or the other, said mechanism including means distinct from the detaching means for causing the delivery of the detached matrices to either selected distributor, one during each successive cycle of operation.

2. A combination according to claim 1 wherein the matrix advancing means comprises a reciprocating member acting to advance each detached matrix in two steps from the box to either selected distributor during two successive cycles, each such matrix being advanced its second step while the next following matrix is advanced its first step.

3. A combination according to claim 1 wherein the delivery mechanism includes a transporter operable to carry each detached matrix into transfer relation to either selected distributor and means operable to simultaneously transfer a matrix from the transporter to the selected distributor and advance the next following matrix from the box to the transporter.

4. Matrix distributing mechanism wherein the matrices, as they are successively detached from a composed line, are delivered according to form to one or the other of two distributors and including, in combination, means for advancing the detached matrices to a relay station, and means operable in opposite directions for shifting the matrices from said station into transfer relation to either of the appropriate distributors.

5. Matrix distributing mechanism wherein the matrices, as they are successively detached from a composed line, are delivered according to form to one or the other of two distributors arranged side by side and including, in combination, means for advancing the detached matrices to a relay station located midway between the two distributors, and a reciprocating transporter for carrying the matrices from said station in one direction or the other into transfer relation to the appropriate distributors.

6. Matrix distributing mechanism wherein the matrices, as they are successively detached from a composed line, are delivered according to form to one or the other of two distributors arranged side by side and including, in combination, means for advancing the detached matrices to a relay station located midway between the two distributors, and a reciprocating transporter operative in one or the other of two zones to carry the matrices from said station into transfer relation to the appropriate distributors.

7. A combination according to claim 6 wherein the matrix advancing means include a reciprocating member and means carried thereby for transferring the matrices from the transporter to the appropriate distributors.

8. Matrix distributing mechanism wherein the matrices, as they are successively detached from a composed line, are delivered according to form to one or the other of two distributors arranged side by side and including, in combination, means for advancing the detached matrices to a relay station located midway between the distributors, a reciprocating transporter operable to carry the matrices from said station into transfer relation to the appropriate distributors, and means for transferring the matrices from the transporter to the distributors.

9. A combination according to claim 8 wherein the transporter reciprocates back and forth between the relay station and one or the other of said distributors and including automatic means for controlling its operation.

10. A combination according to claim 8 wherein the matrix advancing means and the matrix transfer means operate simultaneously and in synchronism with the transporter.

11. Matrix distributing mechanism wherein the matrices, as they are successively detached from a composed line, are delivered according to form to one or the other of two distributors arranged side by side and including, in combination, means for advancing the detached matrices to a relay station located midway between the distributors, a reciprocating transporter operative in one or the other of two zones to carry the matrices from the relay station into transfer relation to the appropriate distributors, and automatic means for selecting the zone of reciprocation of the transporter.

12. A combination according to claim 11 including power actuated devices for operating the transporter and wherein the zone selecting means includes an adjustable control element associated with said devices.

13. A combination according to claim 11 including a power actuated rocking lever for operating the transporter, and wherein the zone selecting means includes a control element adjustable automatically in relation to said lever to reverse the direction of its rocking movements.

14. A combination according to claim 11 including a pair of receiving rails for supporting the matrices at the relay station, and characterized in that the rails are retractible to permit the engagement of the matrices with the transporter.

15. Matrix distributing mechanism wherein the matrices, as they are successively detached from a composed line, are delivered according to form to one or the other of two distributors arranged side by side and including, in combination, means for advancing the detached matrices to a relay station located midway between the distributors, a reciprocating transporter for carrying the matrices from the relay station into transfer relation to the appropriate distributors, a clamping device for holding the matrices in upright position upon the transporter, and means for automatically disengaging said clamping device from the matrices preparatory to their transfer to the distributors.

16. A combination according to claim 15 including means for transferring the matrices from the transporter to the distributors and characterized in that the disengagement of the clamping device from the matrices is controlled by the operation of said means.

17. Matrix distributing mechanism wherein the matrices, as they are successively detached from a composed line, are delivered according to form to one or the other of two distributors arranged side by side and including, in combination, means for advancing the detached matrices to a relay station located midway between the distributors, a reciprocating transporter for carrying the matrices from the relay station into transfer relation to the appropriate distributors, a clamping device carries by the transporter for holding the matrices in upright position thereon, means for automatically disengaging the clamping device from the matrices preparatory to their transfer to the distributors, and means for sustaining the clamping device in inactive position during the return stroke of the transporter to the relay station.

18. A combination according to claim 17 wherein the transporter is operative in one or the other of two zones and wherein the sustaining means for the clamping device includes a pair of fixed cam plates located, respectively, in said zones.

19. Typographical distributing mechanism including, in combination, two distributors arranged side by side for handling matrices of different form, a distributor box to which the matrices are transferred in the line, means for detaching the matrices successively from the line, a pair of retractible rails for supporting the matrices temporarily at a relay station located midway between the distributors, means for advancing the detached matrices into engagement with said rails, a reciprocating transporter for carrying the matrices according to form from the relay station into transfer relation to the appropriate distributors, and an overhead clamping device adapted as the rails are retracted to engage the matrices and hold them in upright position upon the transporter.

20. A combination according to claim 19 wherein the clamping device is operable to effect its engagement with the matrices as the supporting rails are retracted.

21. A combination according to claim 19 wherein the supporting rails are formed with cam surfaces to raise the matrices clear of the transporter as they are advanced to the relay station.

22. A combination according to claim 19 wherein the retraction of the supporting rails is controlled by the operation of the clamping device.

23. A combination according to claim 19 including means responsive to the operation of the transporter for moving the supporting rails to their active or matrix supporting position.

24. A combination according to claim 19 wherein the retraction of the supporting rails to inactive position is effected under spring tension and including a latch controlled by the operation of the clamping device for holding the rails in their active or matrix supporting position.

25. A combination according to claim 19 including a pair of retractible fingers for holding the matrices against displacement upon the supporting rails and means responsive to operation of the clamping device and common to both the fingers and the rails for effecting their retraction simultaneously.

26. Matrix distributing mechanism wherein the matrices, as they are successively detached from a composed line, are delivered according to form to one or the other of two distributors arranged side by side and including, in combination, a pair of retractible rails for supporting the matrices at a relay station located midway between the distributors, means for advancing the detached matrices into engagement with said rails, a reciprocating transporter for carrying the matrices in one direction or the other from the relay station into transfer relation to the appropriate distributors, and means responsive to the operation of the transporter for holding the matrices against displacement upon said rails.

27. A combination according to claim 26 characterized in that the retractible rails support the matrices by their upper projecting ears and wherein the means for holding the matrices thereon against displacement include a pair of retractible gripper fingers arranged to engage the lower projecting ears of the matrices.

28. A combination according to claim 26 wherein the retractible rails are moved automatically to their active or matrix supporting position as the transporter completes its active stroke in either direction and are restored to their inactive or retracted position as the transporter completes its return stroke.

29. A combination according to claim 26 including a cam plate carried by the transporter for moving the retractible rails to their active position against spring tension and an automatically controlled latch for holding them in such position.

30. Matrix distributing mechanism wherein the matrices, as they are successively detached from a composed line, are delivered according to form to one or the other of two distributors arranged side by side and including, in combination, a pair of retractible rails for supporting the matrices at a relay station located midway between the distributors, means for advancing the detached matrices into engagement with said rails, a reciprocating transporter for carrying the matrices in one direction or the other from the relay station into transfer relation to the appropriate distributors, means responsive to the active stroke of the transporter for moving the rails against spring tension to their active or matrix supporting position, a latch for holding the rails in such position, and means responsive to the return stroke of the transporter for disengaging the latch to permit retraction of the rails to their inactive position.

31. A combination according to claim 30 wherein the retractible rails are pivotally mounted so as to swing about a comparatively short radius to and from active position and including a relatively long lever for operating the rails and which is connected thereto at a point adjacent their pivotal axis so as to accelerate their operation.

32. A combination according to claim 30 including safety means for locking the transporter against operation at the receiving station until the supporting rails are restored to their retracted position.

33. A combination according to claim 30 including a lever for moving the retractible rails to and from their active position, and safety means controlled by the operation of the lever for locking the transporter against movement at the relay station until said rails are restored to their retracted position.

34. Matrix distributing mechanism wherein the matrices, as they are successively detached from a composed line, are delivered according to form to one or the other of two distributors arranged side by side and including, in combination, reciprocating means for advancing the detached matrices to a relay station located midway between the distributors, a reciprocating transporter operative in one or the other of two zones to carry the matrices from the relay station into transfer relation to the appropriate distributors, power actuated devices for operating the transporter, and a control element adjustable automatically to select the zone of operation for the transporter.

35. A combination according to claim 34 wherein the control element is capable of being adjusted from one position to another during each successive cycle of operation and according to the form of the matrix advanced to the relay station.

36. A combination according to claim 34 wherein the control element may be sustained in one of its adjusted positions during succeeding cycles of operation so that matrices of the same form will be transported into transfer relation to a selected distributor.

37. A combination according to claim 34 wherein the control element is capable of being adjusted from one position to another and then restored automatically to its original position during the same cycle.

38. Matrix distributing mechanism wherein the matrices, as they are successively detached from a composed line, are delivered according to form to one or the other of two distributors arranged side by side and including, in combination, a reciprocating member for advancing the detached matrices to a relay station located midway between the distributors, a reciprocating transporter operative in one or the other of two zones to carry the matrices from the relay station into transfer relation to the appropriate distributors, power actuated devices for operating the transporter, a control element adjustable automatically to select the zone of operation for the transporter, a trip pawl for sustaining said element against spring pressure in one of its adjusted positions and operable to permit its adjustment to another position, means for restoring the control element to its original position, and means responsive to the operation of the matrix advancing member for operating the trip pawl.

39. A combination according to claim 38 wherein the devices for operating the transporter include a T-shaped rocking lever operatively connected thereto, and characterized in that the control element is formed with banking surfaces and is adjustable relatively to said lever so as to position the banking surfaces beneath the extremity of one or the other of its lateral arms.

40. A combination according to claim 38 wherein the control element is hingedly mounted on a rock shaft and including intermediate connections responsive to the operation of the rock shaft for effecting the adjustments of said element.

41. A combination according to claim 38 characterized in that the movements of the control element to and from its different adjusted positions are effected during the same cycle.

42. A combination according to claim 38 wherein the control element is adjustable automatically to two positions and capable of manual adjustment to a third position in order that matrices previously destined for one distributor may be transported into transfer relation to the other distributor.

43. Matrix distributing mechanism wherein the matrices, as they are successively detached from a composed line, are delivered according to form to one or the other of two distributors arranged side by side and including, in combination, means for advancing the detached matrices to a relay station located midway between the distributors, means for supporting the matrices at said station, a reciprocating transporter operative in one or the other of two zones to carry the matrices from the relay station into transfer relation to the appropriate distributors, power actuated devices for operating the transporter, a control element adjustable automatically to select the zone of operation for the transporter, a trip pawl operable by the matrix advancing means to institute an adjustment of the control element, and form distinguishing devices operable by the matrices as they are detached from the line for instituting the operation of the trip pawl.

44. A combination according to claim 43 including a conditioning agent movable to and from active position and characterized in that the operation of the trip pawl is effected through said agent.

45. A combination according to claim 43 including a conditioning agent movable from inactive to active position to institute the operation of the trip pawl, and characterized in that the form distinguishing devices include fingers operable by matrices destined for a selected distributor as they are detached from line so as to impart such movement to the conditioning agent.

46. Typographical distributing mechanism including, in combination, two distributors arranged side by side for handling matrices of different form, a distributor box to which the matrices are transferred in line, means for detaching the matrices one after another from the line, means for advancing the detached matrices to a relay station located midway between the distributors, a pair of retractible receiving rails for supporting the matrices at said station, a reciprocating transporter for carrying the matrices according to form from the relay station into transfer relation to the appropriate distributors, means for stripping the matrices off the receiving rails as the latter are retracted, means for clamping the matrices upon the transporter as they are stripped off the rails, and means to prevent skidding or other displacement of the matrices as they engage the transporter.

47. A combination according to claim 46 wherein the matrix clamping means are carried by the transporter so as to be effective throughout its active stroke.

48. A combination according to claim 46 wherein the means to prevent skidding of the matrices include a pair of leaf spring elements carried by the transporter and arranged to engage the lower projecting ears of the matrices, and including as a separate element means for camming the said elements out of the path of the matrices as they are advanced to the relay station.

49. A combination according to claim 46 including a yielding overhead guide plate adapted to engage the upper projecting ears of the matrices as they are detached from the line.

50. Typographical distributing mechanism including, in combination, two distributors for handling matrices of different form, a distributor box to which the matrices are transferred in line, means associated with the box for detaching the matrices one after another from the line, mechanism for delivering the detached matrices uninterruptedly and according to form to one distributor or the other, and a plurality of form distinguishing elements adapted in normal position to clear matrices destined for one distributor, one or more of said elements being movable by matrices destined for the other distributor to institute their delivery thereto.

51. A combination according to claim 50 wherein the form distinguishing elements are mounted on a pivot rod and are capable of adjustment individually therealong to different positions, and including as a separate element common means for effecting such adjustments simultaneously to accord with matrices of a selected form.

52. A combination according to claim 50 wherein the delivery mechanism includes means for advancing each detached matrix in two steps, and including as a separate element automatic means tending to restore the form distinguishing elements to their normal position preparatory to the advance in its first step of the next following detached matrix.

53. Typographical distributing mechanism including, in combination, a distributor box equipped with matrix supporting rails and to which the matrices are transferred in line, a reciprocating lifting finger for detaching the matrices one after another from the line, stop shoulders formed on the rails for arresting the leading matrix of the line by its projecting ears in operative relation to the lifting finger, and an auxiliary stop member adapted to arrest a next following matrix of the line in similar relation to said finger irrespective of the setwise position of its projecting ears.

54. A combination according to claim 53 wherein the auxiliary stop member is movable auto- 55. Typographical distributing mechanism including, in combination, a distributor box equipped with matrix supporting rails and to which the matrices are transferred in line, a reciprocating lifting finger for detaching the matrices one after another from the line, stop shoulders formed on the rails for arresting the leading matrix of the line by its projecting ears in operative relation to the lifting finger, an auxiliary stop member movable during the active stroke of the lifting finger into a position to arrest a next following matrix in similar relation thereto, and means for holding the stop member in its matrix arresting position until the lifting finger completse its return stroke.

56. A combination according to claim 55 including means operative to push a detached matrix out of the box during the return stroke of the lifting finger.

57. A combination according to claim 55 wherein the auxiliary stop member is adapted in active position to arrest "back-milled" matrices by their leading side faces with their projecting ears disposed in advance of the stop shoulders of said supporting rails.

58. Matrix distributing mechanism wherein the matrices, as they are successively detached from a composed line, are delivered according to form to one or the other of two distributors arranged side by side and including, in combination, a reciprocating member, a set of pusher elements carried by said member for advancing the detached matrices to a relay station located midway between the distributors, means for shifting the matrices from the relay station into transfer relation to the appropriate distributors, and two sets of transfer fingers also carried by the reciprocating member for transferring the matrices from the shifting means to the distributors.

59. A combination according to claim 58 wherein the two set of transfer fingers terminate in the same vertical plane and at a predetermined distance in advance of the pusher elements.

60. In or for a matrix distributing mechanism wherein the matrices, as they are detached from line, are delivered according to form to one or the other of two distributors arranged side by side, a reciprocating member equipped with one set of pusher elements for advancing a detached matrix to a relay station located midway between the distributors, and with two other sets of pusher elements adapted, respectively, to advance simultaneously a previously detached matrix to the appropriate distributor.

61. Matrix distributing mechanism wherein the matrices, as they are successively detached from a composed line, are delivered according to form to one or the other of two distributors arranged side by side and including, in combination, a reciprocating member for advancing the detached matrices to a relay station located midway between the distributors, a transporter operable to carry the matrices from the said station into transfer relation to the appropriate distributors, and means effective during the active stroke of the reciprocating member for transferring the matrices from the transporter to the distributors.

62. A combination according to claim 61 wherein the matrices are formed with upper and lower projecting ears and the transfer means include two sets of pusher fingers carried by the reciprocating member, each set comprising an upper pair of fingers arranged to engage the upper projecting ears of the matrices and a single lower finger arranged to engage one of the lower projecting ears thereof.

63. Matrix distributing mechanism wherein the matrices, as they are successively detached from a composed line, are delivered according to form to one or the other of two distributors arranged side by side and including, in combination, a reciprocating member for advancing the detached matrices to a relay station located midway between the distributors, a transporter operable to carry the matrices from said station into transfer relation to the appropriate distributors, two pairs of fingers pivotally mounted on the reciprocating member and adapted during its active stroke to transfer the matrices from the transporter to the distributors, and means effective during the return stroke of said member for tilting both pairs of fingers out of the path of matrices being transported to the transfer position.

64. A combination according to claim 63 wherein the two pairs of transfer fingers are rigidly connected together and the tilting means therefor are common to both pairs and effective substantially throughout the return stroke of the reciprocating member.

65. A combination according to claim 63 wherein the two pairs of transfer fingers are rigidly connected together and the tilting means therefor include a fixed cam plate, a pivoted dog associated with one pair of fingers and engaging the cam plate, and means adapted to vary the angular position of the dog in relation to the cam plate during the operation of the reciprocating member.

66. Typographical distributing mechanism including, in combination, two distributors for handling matrices of different form, a plurality of form distinguishing elements adjustable individually to clear matrices destined for one distributor and movable as a unit by matrices destined for the other distributor to institute their delivery thereto, and preadjusted means common to all of said elements for locating them in their adjusted positions.

67. A combination according to claim 66 wherein the form distinguishing elements are freely mounted on a pivot rod for axial as well as pivotal movement and including a rocking bail also mounted on the pivot rod and connected with all of said elements so that the pivotal movement of any one wil be imparted to the others.

68. A combination according to claim 66 wherein the form distinguishing elements are freely mounted on a pivot rod and are capable of adjustment therealong so that one or more may be selected for use to the exclusion of the others.

69. A combination according to claim 66 including a corresponding plurality of spring actuated adjusting rods connected respectively with the form distinguishing elements, and wherein the means for locating said elements in their adjusted positions include a relatively fixed gauge plate equipped with pre-set banking screws arranged to engage the adjusting rods.

70. A combination according to claim 66 wherein the means for locating the form distinguishing elements in their adjusted positions include a relatively fixed gauge plate corresponding with matrices of a selected form and mounted for quick removal and interchange with other gauge plates corresponding with matrices of different form.

71. Matrix distributing mechanism wherein the matrices, as they are successively detached from a composed line, are delivered according to form to one or the other of two distributors arranged side by side and including, in combination, means for advancing the detached matrices to a relay station located midway between the distributors, a pair of retractible rails for supporting the matrices at said station, a reciprocating transporter for carrying the matrices from the relay station into transfer relation to the appropriate distributors, a pair of retractible spring actuated fingers for holding the matrices against displacement upon the supporting rails, means carried by the transporter to control the action of the fingers, and supplementary means acting positively to prevent a disengagement of the fingers from the matrices until the transporter returns to the relay station.

72. A combination according to claim 71 including unitary means for moving the rails and fingers from their retracted position into engaging relation with the matrices, and characterized in that the control of the fingers is such as to permit their engagement with a matrix supported on the rails as the transporter starts its return stroke to the relay station.

73. Matrix distributing mechanism wherein the matrices, as they are successively detached from a composed line, are delivered according to form to one or the other of two distributors arranged side by side and including, in combination, reciprocating means for advancing the detached matrices to a relay station located midway between the distributors, means for supporting the matrices at said station, a reciprocating transporter operative in one or the other of two zones to carry the matrices from the relay station into transfer relation to the appropriate distributors, power actuated devices for operating the transporter, a control element adjustable automatically to select the zone of operation for the transporter, a trip pawl operable to institute an adjustment of the control element, and a conditioning agent controlled by the matrices for instituting the operation of the trip pawl.

74. A combination according to claim 73 including a plurality of form distinguishing elements movable by matrices destined for one of the distributors, and wherein the operation of the conditioning agent is controlled by the movement of said elements.

75. A combination according to claim 73 including a lever for actuating the trip pawl and wherein the matrix advancing means is adapted to operate the lever through the conditioning agent as it completes its active stroke.

76. A combination according to claim 73 wherein the conditioning agent is movable from inactive to active position by matrices destined for one of the distributors as they are detached from the line, and including safety means for locking said agent against movement preparatory to and during the advance of matrices destined for the other distributor.

77. Matrix distributing mechanism wherein the matrices, as they are successively detached from a composed line, are delivered according to form to one or the other of two distributors arranged side by side and including, in combination, reciprocating means for advancing the detached matrices to a relay station located midway between the distributors, means for supporting the matrices at said station, a reciprocating transporter operative in one or the other of two zones to carry the matrices from the relay station into transfer relation to the appropriate distributors, power actuated devices for operating the transporter, a control element adjustable automatically to select the zone of operation of the transporter, a trip pawl operable to institute an adjustment of the control element, a conditioning agent movable from inactive to active position by matrices destined for one of the distributors to institute the operation of the trip pawl, a power operated device for restoring said agent to its inactive position preparatory to the advance of the matrices to the relay station, and automatic safety means for stopping the operation of the distributing mechanism in the event of interference with the normal operation of said device.

78. Matrix distributing mechanism wherein the matrices, as they are successively detached from a composed line, are delivered according to form to one or the other of two distributors arranged side by side and including, in combination, reciprocating means for advancing the detached matrices to a relay station located midway between the distributors, means for supporting the matrices at said station, a reciprocating transporter operative in one or the other of two zones to carry the matrices from the relay station into transfer relation to the appropriate distributors, power actuated devices for operating the transporter, a control element adjustable automatically to select the zone of operation of the transporter, and means responsive to the operation of the matrix advancing means for effecting the adjustments of the control element.

79. Matrix distributing mechanism wherein the matrices, as they are successively detached from a composed line, are delivered according to form to one or the other of two distributors arranged side by side and including, in combination, reciprocating means for advancing the detached matrices to a relay station located midway between the distributors, means for supporting the matrices at said station, a reciprocating transporter operative in one or the other of two zones to carry the matrices from the relay station into transfer relation to the appropriate distributors, power actuated devices for operating the transporter, a control element adjustable automatically to select the zone of operation of the transporter, and a form distinguishing element operable by matrices destined for one of the distributors as they are detached from line for instituting the adjustments of the control element.

80. Matrix distributing mechanism wherein the matrices, as they are successively detached from a composed line, are delivered according to form to one or the other of two distributors arranged side by side and including, in combination, a pair of retractible rails for supporting the matrices at a relay station located midway between the distributors, a latch for holding the rails against spring pressure in their matrix supporting position, means for advancing the detached matrices into engagement with said rails, a reciprocating transporter for carrying the matrices in one direction or the other from the relay station into transfer relation to the appropriate distributors, an overhead clamping device controlling the operation of the latch and adapted as the rails are retracted to engage the matrices and hold them in upright position upon the transporter, and means supplementing the latch and responsive to the return stroke of the transporter for timing the retraction of the matrix supporting rails with the operation of the clamping device.

FRANK C. FROLANDER.
RICHARD R. MEAD.

REFERENCES CITED

The following references are of record in the file of this patent:

UNITED STATES PATENTS

| Number | Name | Date |
|---|---|---|
| 812,585 | Muehleisen | Feb. 13, 1906 |
| 1,427,511 | Billington | Aug. 29, 1922 |
| 1,520,270 | Acherman | Dec. 23, 1924 |